United States Patent
Kusunoki

(10) Patent No.: US 9,832,336 B2
(45) Date of Patent: Nov. 28, 2017

(54) IMAGE-READING DEVICE THAT READS IMAGES BY USING SPREAD-SPECTRUM CLOCK

(75) Inventor: Hideyuki Kusunoki, Nagoya (JP)

(73) Assignee: BROTHER KOGYO KABUSHIKI KAISHA, Nagoya-shi, Aichi-ken (JP)

( * ) Notice: Subject to any disclaimer, the term of this patent is extended or adjusted under 35 U.S.C. 154(b) by 871 days.

(21) Appl. No.: 13/282,396

(22) Filed: Oct. 26, 2011

(65) Prior Publication Data

US 2012/0105919 A1    May 3, 2012

(30) Foreign Application Priority Data

Oct. 29, 2010 (JP) ................................. 2010-244527

(51) Int. Cl.
*H04N 1/12* (2006.01)
*H04N 1/053* (2006.01)
(Continued)

(52) U.S. Cl.
CPC ............. *H04N 1/053* (2013.01); *H04N 1/047* (2013.01); *H04N 1/40056* (2013.01); *H04N 1/12* (2013.01); *H04N 1/193* (2013.01)

(58) Field of Classification Search
CPC .......... H04N 1/12; H04N 1/053; H04N 1/047; H04N 1/40056; H04N 1/193
See application file for complete search history.

(56) References Cited

U.S. PATENT DOCUMENTS 6,975,148 B2 * 12/2005 Miyata et al. ................. 327/156
8,634,446 B2 *  1/2014 Kusunoki ...................... 375/130
(Continued)

FOREIGN PATENT DOCUMENTS

JP    S63-187949 A    8/1988
JP    2001-191585 A   7/2001
(Continued)

OTHER PUBLICATIONS

Japan Patent Office, Notice of Allowance for Japanese Patent Application No. 2009-211991 (counterpart to U.S. Appl. No. 12/878,856), dated Aug. 2, 2011.
(Continued)

*Primary Examiner* — John Wallace
*Assistant Examiner* — Darryl V Dottin
(74) *Attorney, Agent, or Firm* — Merchant & Gould P.C.

(57) ABSTRACT

In an image-reading device, a counting unit counts a number of clock cycles of a spread-spectrum clock as a counter value. A correcting unit corrects one of the counter value and a reference clock cycle number based on a phase detected by the phase detecting unit when the counting unit counts. A comparing unit compares the counter value and the reference clock cycle number and determines whether the counter value and the reference clock cycle number satisfy a prescribed relationship. A time length setting unit sets a length of at least one of a reading time and an irradiation time based on: a timing when the counting unit starts counting to set the time length; and a timing when the comparing unit determines that the compared values satisfy the prescribed relationship, such that the time length set by the time length setting unit remains constant.

10 Claims, 15 Drawing Sheets

(51) Int. Cl.
*H04N 1/193* (2006.01)
*H04N 1/047* (2006.01)
*H04N 1/40* (2006.01)

(56) References Cited

U.S. PATENT DOCUMENTS

| | | |
|---|---|---|
| 2004/0013321 A1 | 1/2004 | Ohkawa |
| 2004/0240522 A1 | 12/2004 | Bu et al. |
| 2005/0063021 A1 | 3/2005 | Sakai |
| 2005/0069019 A1 | 3/2005 | Kaizuka |
| 2006/0098714 A1 | 5/2006 | Shin et al. |
| 2008/0316292 A1* | 12/2008 | Shukuya .................. B41J 2/473 347/249 |
| 2009/0190631 A1 | 7/2009 | Hsieh et al. |
| 2009/0284297 A1 | 11/2009 | Ebuchi |
| 2010/0080264 A1* | 4/2010 | Yokochi .................. H04B 1/69 375/130 |
| 2010/0080630 A1 | 4/2010 | Nishiyama |
| 2011/0062994 A1* | 3/2011 | Kusunoki ....................... 327/48 |
| 2011/0211235 A1* | 9/2011 | Osakabe et al. .............. 358/475 |

FOREIGN PATENT DOCUMENTS

| | | |
|---|---|---|
| JP | 2002-281252 A | 9/2002 |
| JP | 2003-060862 A | 2/2003 |
| JP | 2004-072606 A | 3/2004 |
| JP | 2005-094655 A | 4/2005 |
| JP | 2006-332924 A | 12/2006 |
| JP | 2007-078617 A | 3/2007 |
| JP | 2008-077199 A | 4/2008 |
| JP | 2000-224392 A | 8/2008 |
| JP | 2010-079203 A | 4/2010 |
| JP | 2010-087805 A | 4/2010 |
| JP | 2010-160588 A | 7/2010 |
| JP | 2011-061705 A | 3/2011 |
| WO | 2007-080719 A1 | 7/2007 |

OTHER PUBLICATIONS

Japan Patent Office, Office Action for Japanese Patent Application No. 2010-244527 (counterpart Japanese patent application), dated Jan. 29, 2013.

United States Patent and Trademark Office, Notice of Allowance for U.S. Appl. No. 12/878,856 (related to above-captioned patent application), dated Sep. 18, 2013.

\* cited by examiner

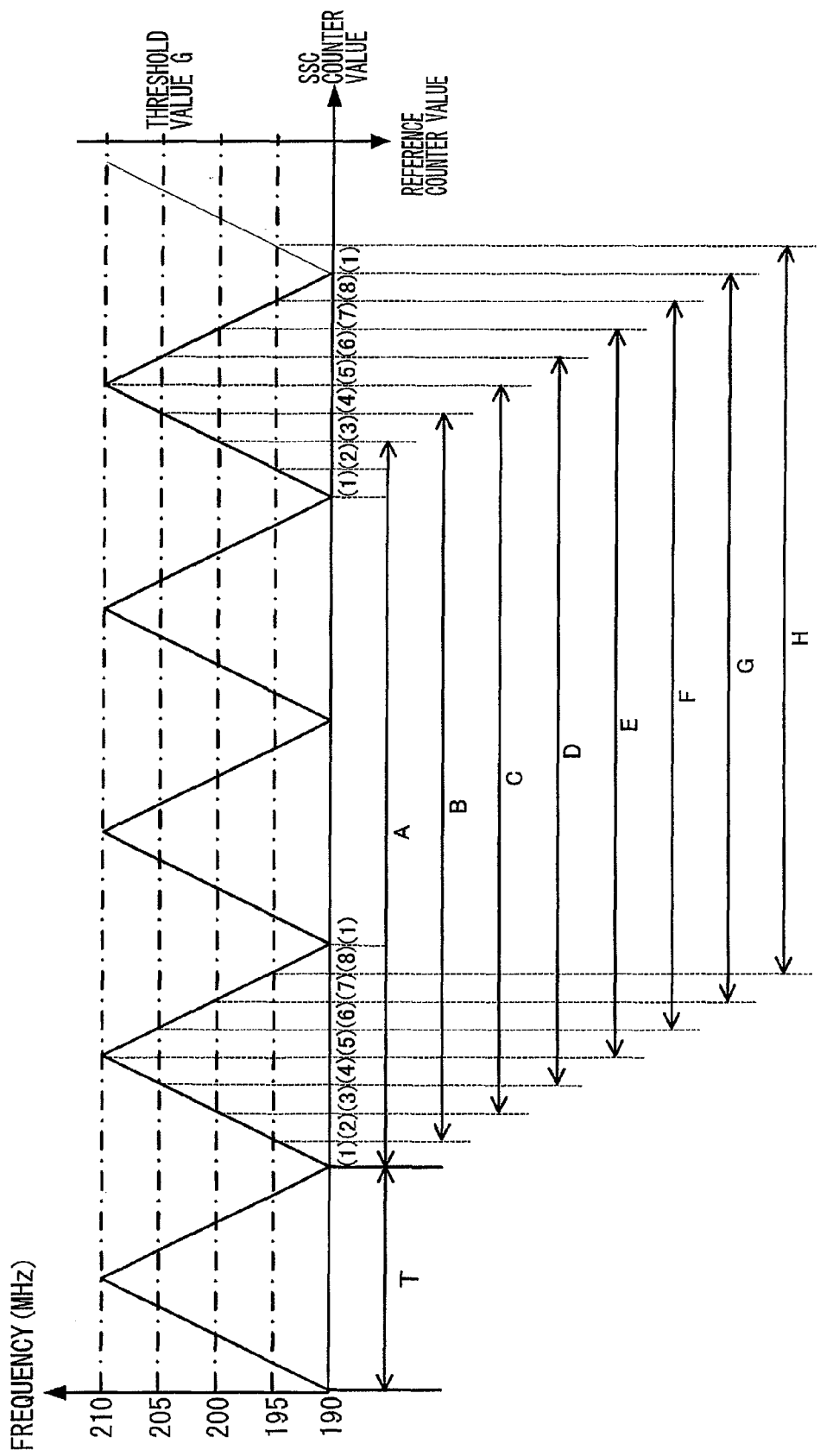

IMAGE-READING DEVICE THAT READS IMAGES BY USING SPREAD-SPECTRUM CLOCK

CROSS REFERENCE TO RELATED APPLICATION

This application claims priority from Japanese Patent Application No. 2010-244527 filed Oct. 29, 2010. The entire content of this priority application is incorporated herein by reference.

TECHNICAL FIELD

The present invention relates to an image-reading device having a reading unit for reading an image from an original that moves relative to the reading unit in a constant direction and at a constant speed, and more particularly to an image-reading device that uses spread-spectrum clock generation to read the original image.

BACKGROUND

As a measure for reducing electromagnetic interference (EMI) inherent in this type of image-reading device, the use of spread-spectrum clock generation has been proposed for various electronic devices incorporating such an image-reading device in order to modulate the clock frequency over a constant modulation period. However, if the irradiation time of the light source in the image-reading device and the reading time of the reading unit in the same are set based on prescribed numbers of clock cycles of a spread-spectrum clock, the irradiation time and reading time will also vary in response to changes in the frequency of the spread-spectrum clock. However, if the irradiation time or reading time is fluctuating, the reading unit cannot accurately read the image on the original which moves at a constant speed relative to the reading unit. Japanese Patent Application Publication No. 2006-332924 has proposed a method to set the irradiation time to an integral multiple of the modulation period for the spread-spectrum clock, thereby setting the irradiation time to a constant value that is not influenced by changes in the frequency of the spread-spectrum clock. United States Patent Application Publication No. 2004/013321 A1 has proposed a method to set the reading time to an integral multiple of the modulation period for the spread-spectrum clock, thereby setting the reading time to a constant value that is not influenced by changes in the frequency of the spread-spectrum clock.

SUMMARY

However, since it is necessary to set the irradiation time and the reading time to integral multiples of the modulation period for the spread-spectrum clock in order to achieve constant values that are not influenced by changes in the frequency of the spread-spectrum clock, the irradiation time and reading time cannot be arbitrarily set to desired lengths of time.

Therefore, it is an object of the present invention to provide an image-reading device that sets the irradiation time or the reading time based on a number of clock cycles of the spread-spectrum clock and that can suppress fluctuations in the length of the irradiation time or reading time caused by changes in the frequency of the spread-spectrum clock, even when the irradiation time or reading time is set to a desired length.

In order to attain the above and other objects, the invention provides an image-reading device, including: a reading unit; a spread-spectrum clock generating unit; a counting unit; a phase detecting unit; a correcting unit; a comparing unit; and a time length setting unit. The reading unit is configured to read an image from an original in units of reading times as the original moves relative to the reading unit at a constant speed and in a constant direction, the reading unit comprising a light source that is configured to irradiate light. The spread-spectrum clock generating unit is configured to generate a spread-spectrum clock whose frequency fluctuates over a fixed modulation period. The counting unit is configured to count a number of clock cycles of the spread-spectrum clock as a counter value. The phase detecting unit is configured to divide the modulation period into a plurality of phases and to detect a phase of the spread-spectrum clock. The correcting unit is configured to correct either one of the counter value counted by the counting unit and a reference clock cycle number based on a phase that is detected by the phase detecting unit at a time when the counting unit performs counting, the reference clock cycle number being defined as reference for a desired length of at least one of a reading time and an irradiation time, the irradiation time being defined as a time during which the light source irradiates light, the irradiation time being within the reading time. The comparing unit is configured to compare, with each other, the counter value and the reference clock cycle number, either one of which has been corrected by the correcting unit, and to determine whether or not the counter value and the reference clock cycle number satisfy a prescribed relationship. The time length setting unit is configured to set the length of the at least one of the reading time and the irradiation time based on: a timing when the counting unit starts counting to set the length of the at least one of the reading time and the irradiation time; and a timing when the comparing unit determines that the compared values satisfy the prescribed relationship, to thereby allow the time length set by the time length setting unit to remain constant despite changes in the frequency of the spread-spectrum clock.

BRIEF DESCRIPTION OF THE DRAWINGS

The particular features and advantages of the invention as well as other objects will become apparent from the following description taken in connection with the accompanying drawings, in which:

FIG. 4 is an explanatory diagram illustrating changes in frequency of a spread-spectrum clock generated by a clock generator shown in FIG. 2;

FIG. 9 is a timing chart illustrating how the control block shown in

FIG. 8 controls various time lengths;

DETAILED DESCRIPTION

Next, embodiments of the present invention will be described while referring to the accompanying drawings.

First, an image-reading device 910 according to a first embodiment of the present invention will be described with reference to FIGS. 1-7.

Figure 1:
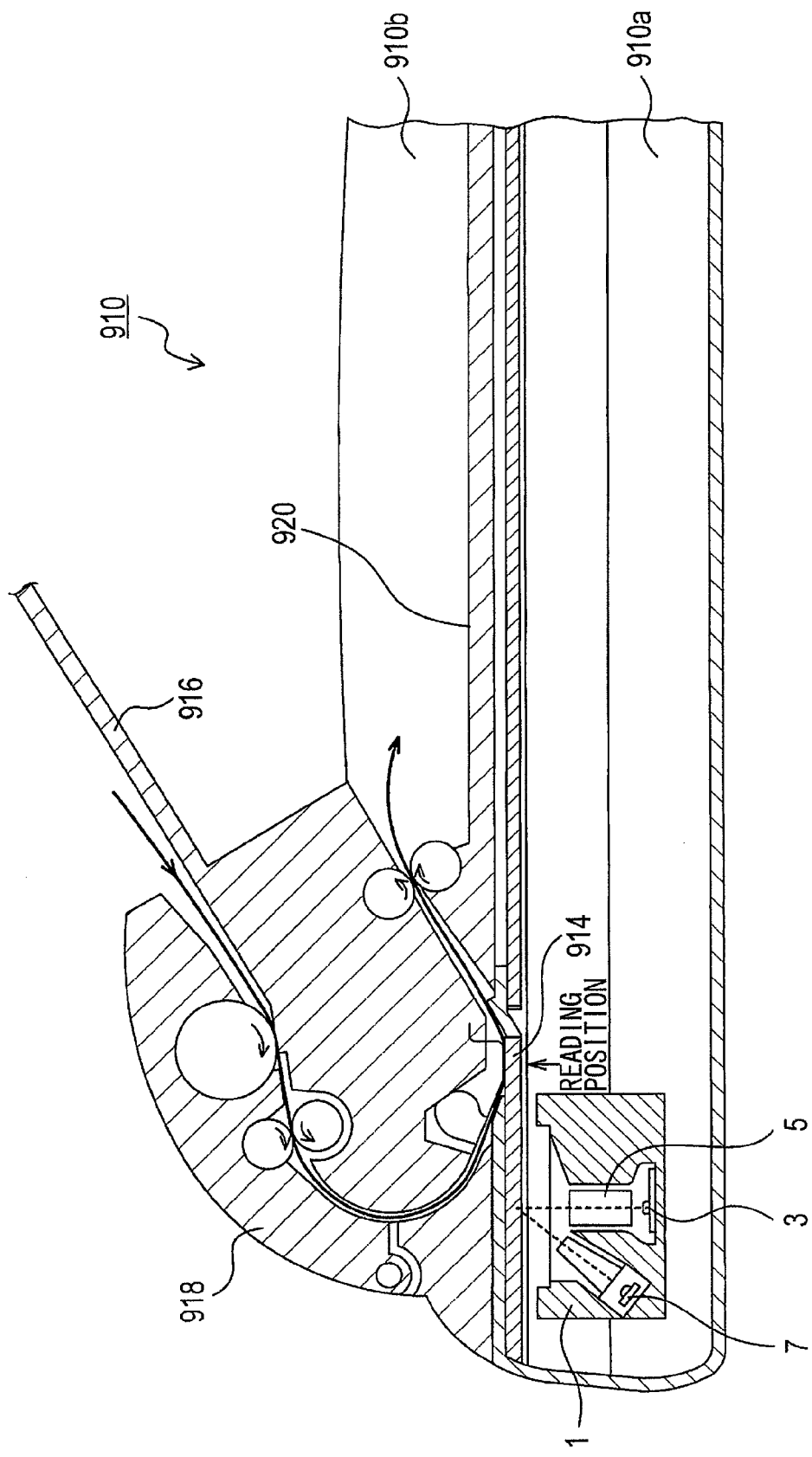
FIG. 1 is a cross-sectional view showing the structure of an image-reading device according to a first embodiment of the present invention.

As shown in FIG. 1, the image-reading device 910 includes both a flatbed mechanism and an automatic document feeding mechanism (ADF). The image-reading device 910 has a clamshell structure configured of a cover part 910b attached to a flatbed unit 910a and is capable of opening and closing thereon.

The flatbed unit 910a is provided with a reading device 1 and a first platen glass 914. The cover part 910b has an original feeding tray 916, an original conveying device 918, and an original discharge tray 920.

The reading device 1 is also provided with a contact image sensor (CIS) 3, a lens 5, and a light source 7. The reading device 1 having this construction reads an image from the original by irradiating light from the light source 7 configured of an LED onto the original at a reading position and focusing the light reflected from the original onto the CIS 3 through the lens 5.

The flatbed unit 910a also has a drive mechanism (not shown) for conveying the reading device 1 in the left and right directions of FIG. 1. When reading an original, the drive mechanism conveys the reading device 1 so that the CIS 3 is positioned directly below the reading position.

Figure 2:
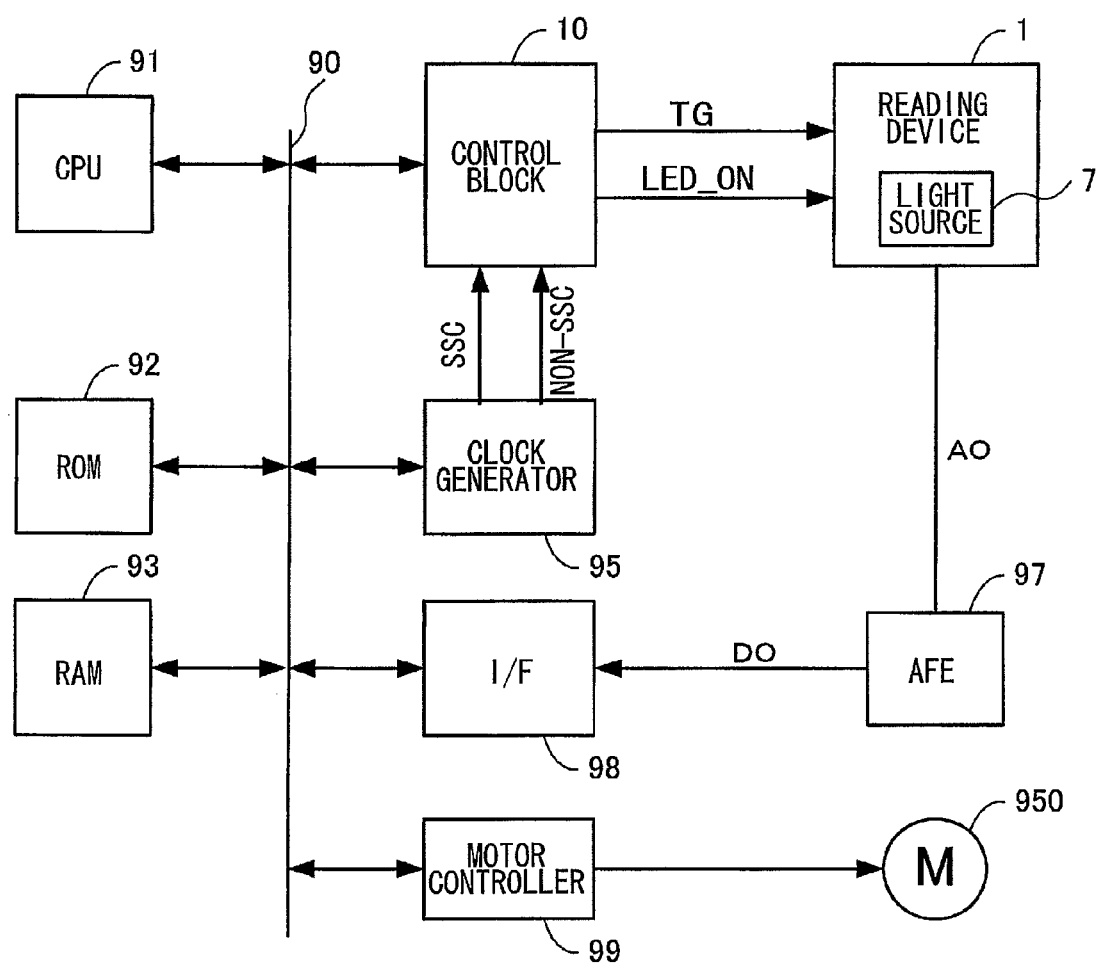
FIG. 2 is a block diagram showing the structure of a control system in the image-reading device of FIG. 1.

As shown in FIG. 2, a control block 10 for controlling the reading device 1 is connected to a CPU 91, a ROM 92, and a RAM 93 via a bus 90. As will be described later, the CIS 3 is configured of a plurality of light-receiving elements arranged in an array along a main scanning direction (the direction orthogonal to the drawing of FIG. 1). The control block 10 inputs various signals into the reading device 1 including a TG signal instructing the reading device 1 to release an accumulated charge in response to the quantity of light received by the light-receiving elements, and an LED_ON signal instructing the reading device 1 to turn on the light source 7. As shown in FIG. 2, a clock generator 95 is connected to the bus 90. The clock generator 95 inputs a spread-spectrum clock (SSC) and a reference clock (non-SSC) into the control block 10. The SSC is modulated in its frequency over a fixed modulation period T, while the non-SSC has a fixed frequency.

As shown in FIG. 4, the frequency of the SSC varies between 190 and 210 MHz with the fixed modulation period T. In this example, the modulation period T is defined by 10,000 clock cycles of the SSC and is equal to 50 μs. By dividing the frequency range of 190 to 200 MHz into four smaller frequency ranges of 5 MHz each, the modulation period T is divided into eight (8) phases of 1,250 clock cycles each based on the counter value (number of clock cycles of the SSC). In the embodiment, the phases of the SSC include: Phase (1) for the period in which the frequency increases from 190 to 195 MHz, Phase (2) for the period in which the frequency increases from 195 to 200 MHz, . . . , and Phase (8) for the period in which the frequency decreases from 195 to 190 MHz.

As shown in FIG. 2, the reading device 1 outputs analog output AO to an analog front end (AFE) 97 based on the image read by the CIS 3. The AFE 97 functions to convert the analog output AO to digital output DO. The AFE 97 inputs the digital output DO into an interface 98 connected to the bus 90. The bus 90 is also connected to motor controllers. One motor controller 99 connected to the bus 90 drives a motor 950 to rotate at a constant speed for driving the original conveying device 918 at a corresponding constant speed. Another motor controller (not shown) drives a motor (not shown) at a constant speed for moving the reading device 1 at a corresponding constant speed in left and right directions.

Figure 3A:
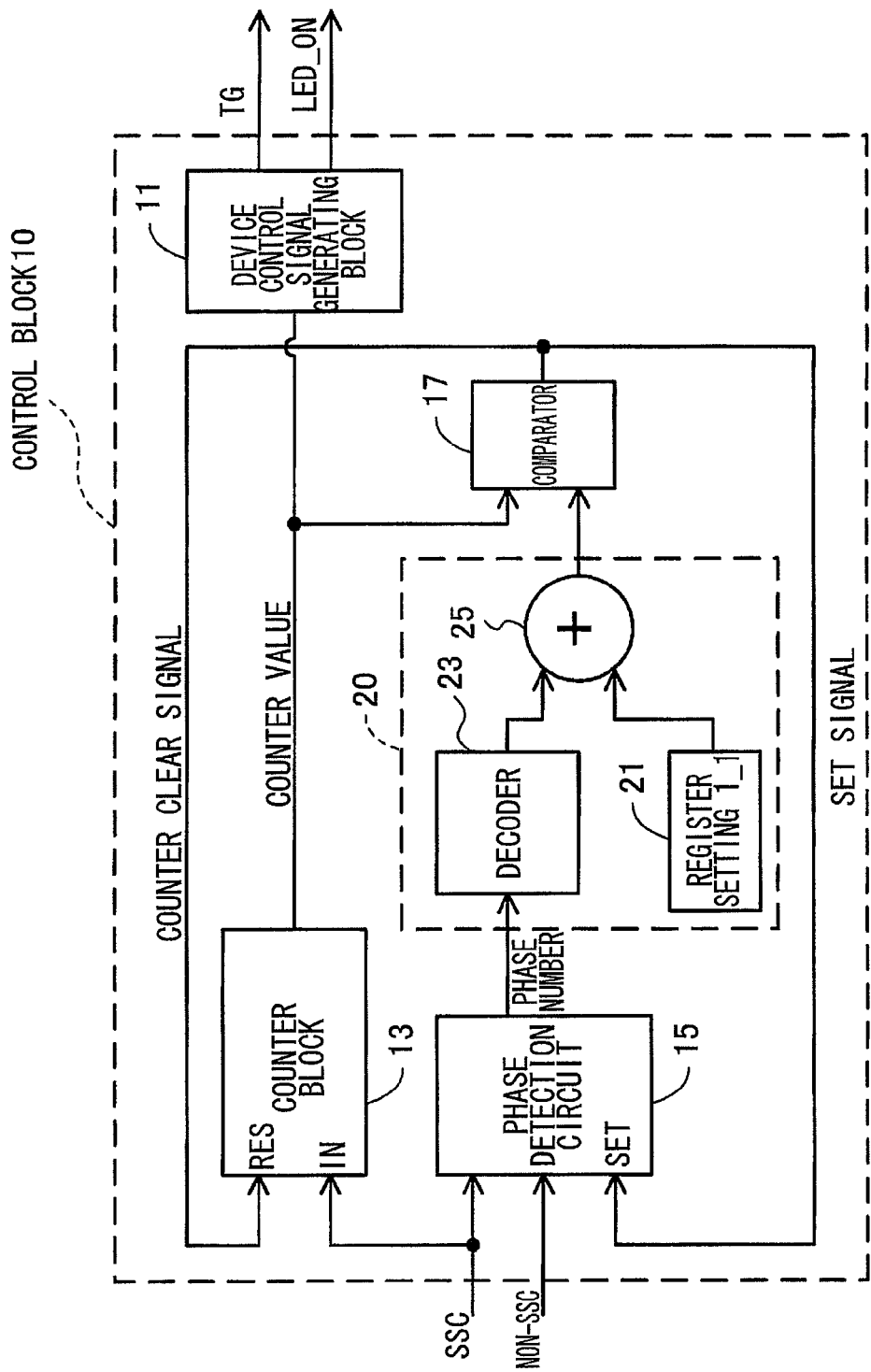
FIG. 3A is a block diagram showing the structure of a control block shown in FIG. 2.

As shown in FIG. 3A, the control block 10 includes a device control signal generating block 11 for outputting the. TG signal and LED_ON signal described above, and a counter block 13 for supplying a counter value to the device control signal generating block 11 in order to regulate the timing at which the device control signal generating block 11 outputs the signals. The counter block 13 has an IN terminal and an RES terminal. The counter block 13 counts the number of clock cycles of the SSC inputted into the IN terminal, and outputs the counted number (counter value) to the device contol signal generating block 11.

Since the frequency of the SSC changes as shown in FIG. 4, the periods of the TG signal and LED_ON signal generated by the device control signal generating block 11 will also change according to which phase the SSC is in, if the device control signal generating block 11 generates the signals based on the counter value received from the counter block 13, without taking any steps to account for frequency changes in the SSC. The interval between the sequential rising edges of the TG signal determines the reading time of the reading device 1, and the period of the LED_ON signal determines the irradiation time of the light source 7. So, if the interval between the sequential rising edges of the TG signal and the period of the LED_ON signal vary in response to changes in the frequency of the SSC, the reading time and irradiation time will also vary. Since the original moves at a constant speed relative to the reading device 1, the reading device 1 cannot accurately read the image on the original if the irradiation time and reading time are fluctuating. In order to prevent occurrence of this problem, the control block 10 according to the first embodiment is further provided with a phase detection circuit 15, a comparator 17, and a correction circuit 20.

The phase detection circuit 15 is configured to receive the SSC and the non-SSC from the clock generator 95. The phase detection circuit 15 has an SET terminal. The phase detection circuit 15 is configured to continuously monitor the phase of the SSC by comparing the SSC to the non-SSC and continuously output a phase number that has been detected when a SET signal is inputted into the SET terminal from the comparator 17. The phase number outputted from the phase detection circuit 15 will be referred to also as "SET-signal timing phase number" hereinafter.

Next will be described the phase detection circuit 15 in greater detail with reference to FIGS. 3B and 3C.

Figure 3B:
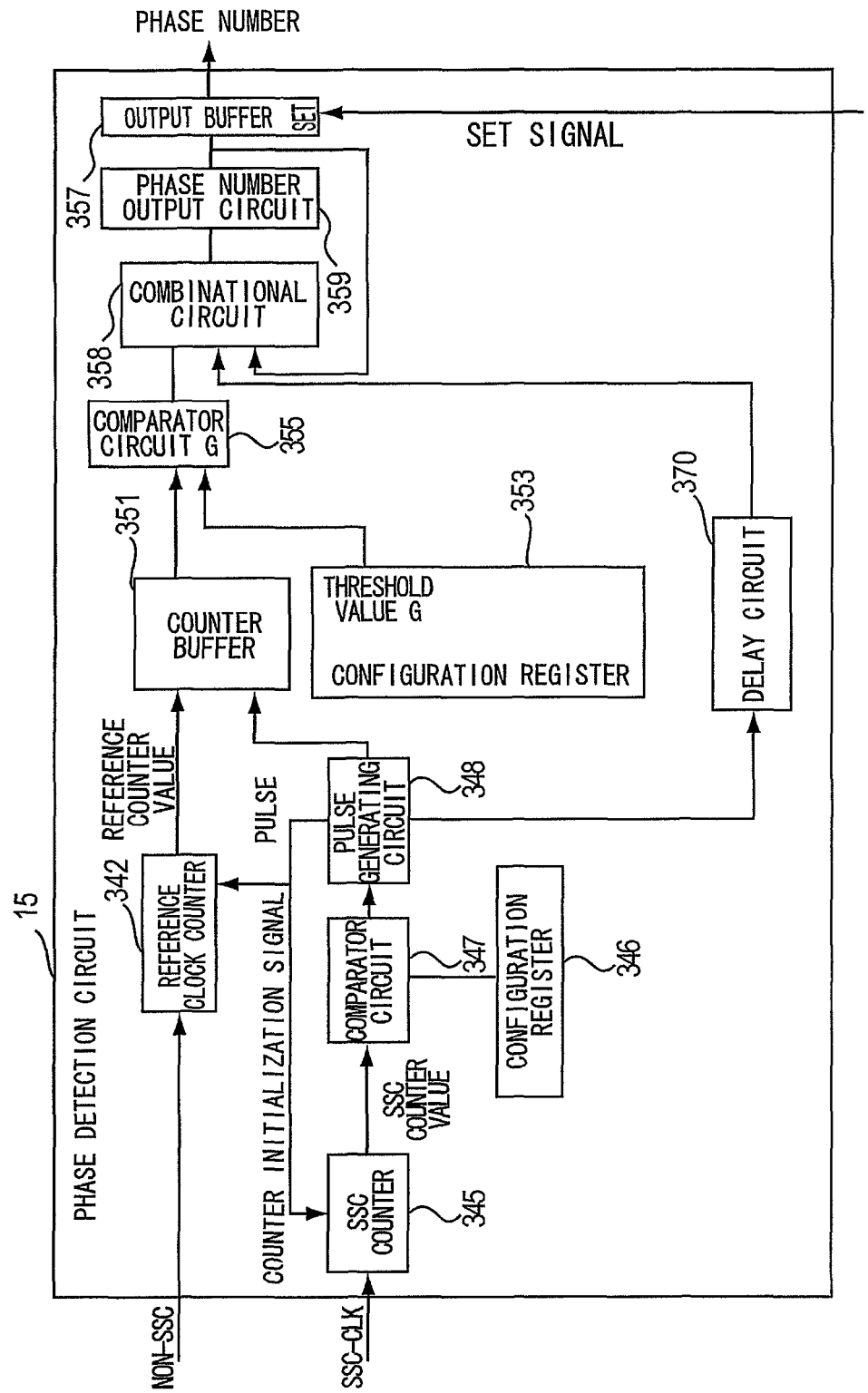
FIG. 3B is a block diagram showing the configuration of a phase detection circuit shown in FIG. 3A.
Figure 3C:
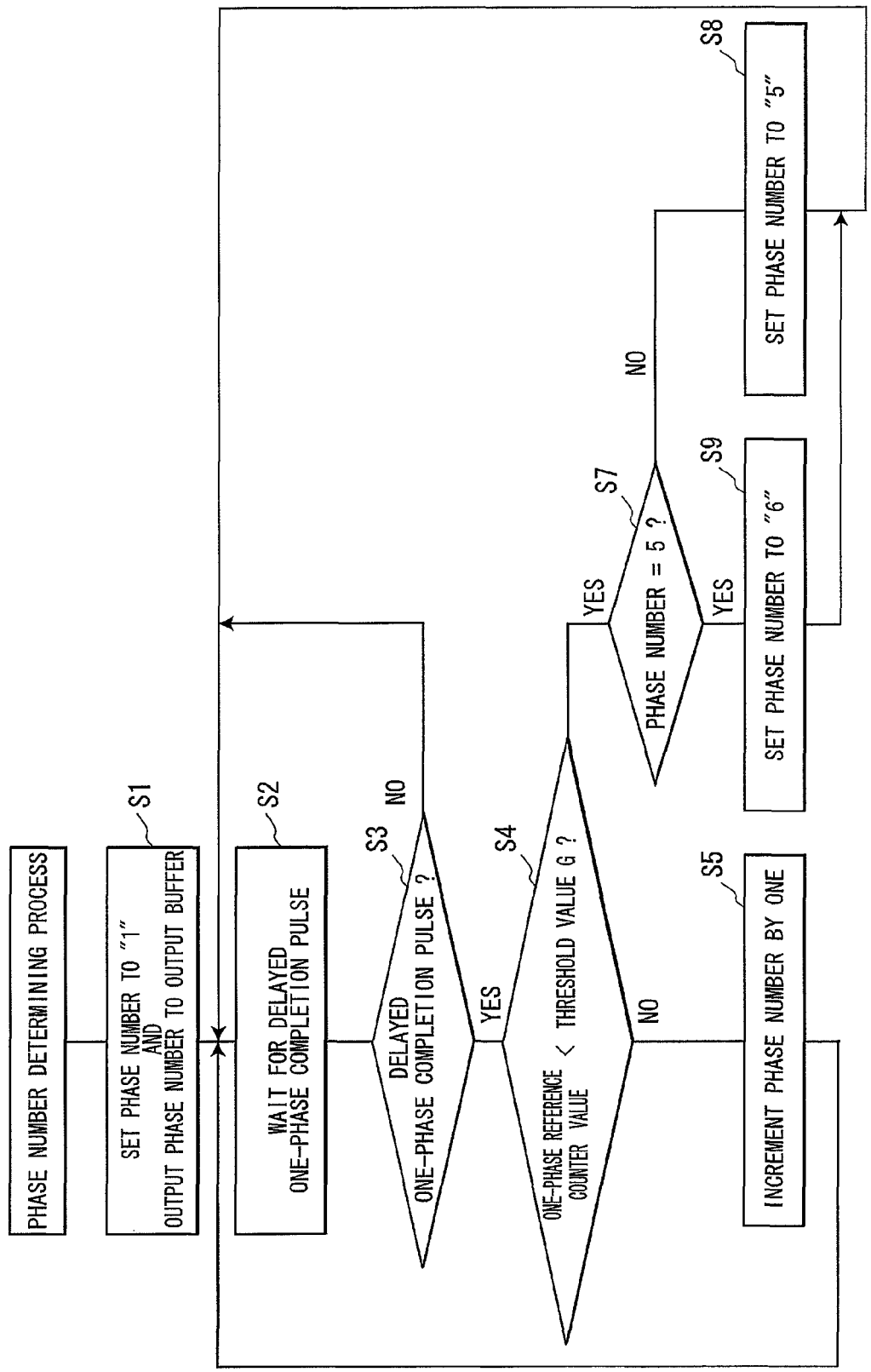
FIG. 3C is a flowchart illustrating steps in a phase number determining process executed by a combinational circuit shown in FIG. 3B.

As shown in FIG. 3B, the phase detection circuit 15 includes: a reference clock counter 342; an SSC counter 345; a comparator circuit 347; a configuration register 346; a pulse generating circuit 348; a delay circuit 370; a counter buffer 351; a configuration register 353; a comparator circuit 355; a combinational circuit 358; a phase number output circuit 359; and an output buffer 357. The output buffer 357 is provided with the SET terminal for receiving the SET signal from the comparator 17.

The SSC counter 345 is configured to receive the SSC from the clock generator 95, to count the number of pulses in the SSC (the number of clock cycles of the SSC), and to output the counted number as an SSC counter value. The configuration register 346 stores the prescribed counter value (1,250, in this example) that is equal to the total number of pulses of the SSC that should be counted during each phase. The comparator circuit 347 is configured to receive the SSC counter value from the SSC counter 345 and to compare the SSC counter value with the prescribed counter value stored in the configuration register 46. The pulse generating circuit 348 is configured to generate a pulse when the comparison results by the comparator circuit 347 indicates that the SSC counter value and the prescribed counter value match, in other words, when the SSC counter value has reached the prescribed value. In this way, the pulse generating circuit 348 generates a pulse each time the phase detection circuit 15 has completed in receiving one phase's worth of SSC pulses. The pulse generated by the pulse generating circuit 348 will be referred to as "one-phase completion pulse" hereinafter.

The pulse generating circuit 348 outputs the generated one-phase completion pulse to the SSC counter 345 as a counter initialization signal. Upon receipt of the one-phase completion pulse, the SSC counter 345 initializes the SSC counter value. The pulse generating circuit 348 outputs the generated one-phase completion pulse also to the reference clock counter 342 as a counter initialization signal. The pulse generating circuit 348 outputs the generated one-phase completion pulse also to the counter buffer 351 and to the delay circuit 370.

The reference clock counter 342 is configured to receive the reference clock (non-SSC) from the clock generator 95, to count the number of pulses in the reference clock (the number of clock cycles of the reference clock), and to output the counted number as a reference counter value. Upon receipt of the one-phase completion pulse from the pulse generating circuit 348, the reference clock counter 342 initializes the reference counter value. Accordingly, the reference clock counter 342 measures a period of time defined since the SSC counter 345 has started counting pulses of the SSC until the SSC counter 345 has counted the prescribed number of (1,250) pulses of the SSC.

The counter buffer 351 is configured to receive the reference counter value from the reference clock counter 342 and the one-phase completion pulse from the pulse generating circuit 348. The counter buffer 351 is configured to continuously output a reference counter value that the counter buffer 351 receives when the counter buffer 351 receives a one-phase completion pulse. In other words, the counter buffer 351 outputs the number of the reference clock pulses that has been counted during a period of one phase and therefore that indicates the period of one phase. The reference counter value outputted from the counter buffer 351 will be referred to as "one-phase reference counter value" hereinafter. The counter buffer 351 continuously outputs the one-phase reference counter value from when the counter buffer 351 receives the one-phase completion pulse until when the counter buffer 351 receives the next one-phase completion pulse. When receiving the next one-phase completion pulse, the counter buffer 351 updates the one-phase reference counter value to a new reference counter value that is presently being received from the reference clock counter 342.

The configuration register 353 stores a predetermined threshold value G. The comparator circuit 355 is for comparing the one-phase reference counter value outputted from the counter buffer 351 with the threshold value G.

The time required to receive the prescribed number of (1,250) SSC pulses is less at higher frequencies of the SSC. So, the time period of one phase decreases as the frequency of the SSC increases. In other words, as shown in FIG. 4, as the frequency of the SSC increases along the frequency axis (left-side vertical axis), the number of reference clock pulses counted during one phase (one-phase reference counter value) decreases along the reference counter value axis (right-side vertical axis). The threshold value G is for determining whether the SSC is in phase (4) or (5), in which the SSC has higher frequencies than when the SSC is in other phases (1)-(3) and (6)-(8). For example, the threshold value G can be theoretically calculated as the smallest whole number among all the whole numbers that are greater than or equal to the number of pulses of the reference clock that will be counted during a period, in which the prescribed number of (1,250) pulses with the fixed frequency of 207.5 MHz (average frequency of 205 MHz and 210 MHz) are generated.

The comparator circuit 355 compares the one-phase reference counter value outputted from the counter buffer 351 with the threshold value G. The comparator circuit 355 judges whether or not the one-phase reference counter value is smaller than the threshold value G. It is known that the SSC is in phase (4) or (5) if the one-phase reference counter value is smaller than the threshold value G.

The comparison results from the comparator circuit 355 are inputted into the combinational circuit 358 together with the one-phase completion pulse from the pulse generating circuit 348 that has been delayed by the delay circuit 370. The delay circuit 370 functions to allow for processing time from the moment the pulse generating circuit 348 generates the one-phase completion pulse until the reference count value at the moment of generation of the subject one-phase completion pulse is reflected in the comparison results of the comparator circuit 355.

The combinational circuit 358 executes a phase number determining process shown in FIG. 3C to determine a phase number based on the one-phase completion pulse delayed by the delay circuit 370 (hereinafter referred to as the "delayed one-phase completion pulse") and the comparison results from the comparator circuit 355, and outputs the determined phase number to the phase number output circuit 359.

The phase number output circuit 359 is configured: to receive the phase number from the combinational circuit 358; to output the received phase number to the output buffer 357; and to output the received phase number back to the combinational circuit 358.

The output buffer 357 is configured to receive the phase number from the phase number output circuit 359. The output buffer 357 receives, at its SET terminal, the SET signal from the comparator 17. The output buffer 357 is configured to continuously output, as the SET-signal timing phase number, a phase number that the output buffer 357 receives when the output buffer 357 receives a SET signal from the comparator 17. The output buffer 357 continuously outputs the SET-signal timing phase number from when the output buffer 357 receives the SET signal until when the output buffer 357 receives the next SET signal. Upon receiving the next SET signal, the output buffer 357 updates the SET-signal timing phase number to a new phase number that is presently being received from the phase number output circuit 359.

The phase number determining process executed by the combinational circuit 358 will be described below with reference to FIG. 3C.

In S1 of the phase number determining process, the combinational circuit 358 sets the phase number to "1". When the combinational circuit 358 sets the phase number to "1" in S1, the phase number output circuit 359 outputs this phase number to the output buffer 357 and outputs the same phase number back into the combinational circuit 358 as feedback.

In S2 the combinational circuit 358 enters a pulse wait state to wait for the delayed one-phase completion pulse from the delay circuit 370, and in S3 determines whether the delayed one-phase completion pulse was inputted from the delay circuit 370. While the delayed one-phase completion pulse has not been inputted (S3: NO), the combinational circuit 358 returns to S2 and continues to wait while looping between S2 and S3. In other words, the combinational circuit 358 waits until counting of the prescribed number of (1,250) pulses of SSC is completed. When the delayed one-phase completion pulse is inputted (S3: YES), in S4 the combinational circuit 358 determines whether the one-phase reference counter value outputted from the counter buffer 351 is smaller than the threshold value G based on the comparison results from the comparator circuit 355. If the one-phase reference counter value is no smaller than the threshold value G (S4: NO), in S5 the combinational circuit 358 increments the phase number by one (1), and returns to S2 described above.

However, when the combinational circuit 358 determines in S4 that the one-phase reference counter value is smaller than the threshold value G (S4: YES), in S7 the combinational circuit 358 determines whether or not the phase number is "5". If the phase number is not "5" (S7: NO), then in S8 the combinational circuit 358 sets the phase number to "5". If the phase number is already "5" (S7: YES), in S9 the combinational circuit 358 sets the phase number to "6". After setting the phase number in S8 or S9 in this way, the combinational circuit 358 returns to S2 described above.

Specifically, when the one-phase reference counter value is smaller than the threshold value G (S4: YES), the phase number at that point in time must be either "4" or "5", as illustrated in FIG. 4. Therefore, the combinational circuit 358 sets the phase number to "6" in S9 when the phase number is "5" (S7: YES) and sets the phase number to "5" in S8 when the phase number is not "5" (S7: NO), i.e., when the phase number is "4".

Thus, the combinational circuit 358 increments the phase number by one (1) in S5 every time the prescribed number of (1,250) pulses of SSC are received, while repeatedly adjusting the phase number in S7-S9 every time the one-phase reference counter value becomes smaller than the threshold value G. The adjustment of the phase number in S7-S9 is executed every time after one modulation period T (10,000 counts) has passed. Thus, the combinational circuit 358 can continuously determine the phase of the SSC with high precision.

The output buffer 357 continuously outputs, as the SET-signal timing phase number, a phase number that the output buffer 357 receives when the output buffer 357 receives the SET signal from the comparator 17. When newly receiving a SET signal from the comparator 17, the output buffer 357 updates the SET-signal timing phase number to a new phase number that the output buffer 357 is currently receiving from the phase number output circuit 359.

Next, the correction circuit 20 will be described with reference to FIG. 3A.

The correction circuit 20 includes a register 21, a decoder 23, and an adder 25. The phase number (SET-signal timing phase number) outputted from the phase detection circuit 15 is received by the decoder 23 and used for the control process described later.

A reading time is defined as the interval between sequential rising edges of the TG signal. A uniform reading time length can be achieved regardless of what phase the SSC is in when the reading time begins by setting the reading time to an integral multiple of the modulation period T. However, when the length of the reading time is set to an arbitrary desired value, such as 3.25 times the modulation period T (i.e., 32,500 clock cycles), the reading time length varies from 162.09 to 163.03 µs, as shown in Table 1 below. For reference, the periods (A)-(H) shown in Table 1 are also indicated in FIG. 4. Table 1 additionally shows the number of clock cycles (rounded off to the closest whole number) at which the reading time reaches the desired length of 162.54 µs when the starting point of the reading time has the same phase as the starting point for one of the periods (A)-(H), together with a correction coefficient for correcting the 32,500 clock cycles to the number of clock cycles listed in the table for 162.54 µs.

TABLE 1

| Period | µs | No. of clock cycles at 162.54 µs | Correction coefficient |
|---|---|---|---|
| (A) = three modulation periods + (1) + (2) | 162.86 | 32435 | −65 |
| (B) = three modulation periods + (2) + (3) | 162.54 | 32500 | 0 |
| (C) = three modulation periods + (3) + (4) | 162.23 | 32566 | 66 |
| (D) = three modulation periods + (4) + (5) | 162.09 | 32597 | 97 |
| (E) = three modulation periods + (5) + (6) | 162.23 | 32566 | 66 |
| (F) = three modulation periods + (6) + (7) | 162.54 | 32500 | 0 |
| (G) three modulation periods + (7) + (8) | 162.86 | 32435 | −65 |
| (H) = three modulation periods + (8) + (1) | 163.03 | 32402 | −98 |

Therefore, the correction circuit 20 has the following configuration for inputting, into the comparator 17, the number of SSC clock cycles at which the reading time reaches 162.54 µs.

The decoder 23 has a built-in table, such as that shown in Table 2 below, correlating correction coefficients with phase numbers (1)-(8) that appear first during the respective periods (A)-(H). The phase number (SET-signal timing phase number) inputted from the phase detection circuit 15 indicates from which phase the reading time has begun. So, the decoder 23 outputs a correction coefficient that is associated with a phase number that is equal to the phase number inputted from the phase detection circuit 15.

TABLE 2

| Phase number at the beginning of Period | Correction coefficient |
|---|---|
| (1) | −65 |
| (2) | 0 |
| (3) | 66 |
| (4) | 97 |
| (5) | 66 |
| (6) | 0 |
| (7) | −65 |
| (8) | −98 |

The register 21 stores a register setting 1_1 (32,500 in this example) as a reference clock cycle number (reading reference clock cycle number) indicative of a desired length of the reading time in terms of the clock cycle number, and outputs this value as needed.

The adder 25 adds the register setting 1_1 stored in the register 21 to the correction coefficient outputted from the decoder 23. The obtained sum is equal to the clock cycle number at 162.54 μs that is stored in Table 1 in association with the phase number (SET-signal timing phase number) outputted from the phase detection circuit 15.

Obviously, the register setting 1_1 and the output value (correction coefficient) from the decoder 23 may be set to values other than those given above for different desired reading lengths or different SSC fluctuation amplitudes.

The comparator 17 compares the clock cycle number inputted from the adder 25 with the counter value outputted from the counter block 13 and generates a high level signal when the two values match. The high level signal is inputted into the SET terminal of the phase detection circuit 15 as a SET signal. The high level signal is inputted also into the RES terminal of the counter block 13 as a counter clear signal for resetting the counter.

Figure 5:
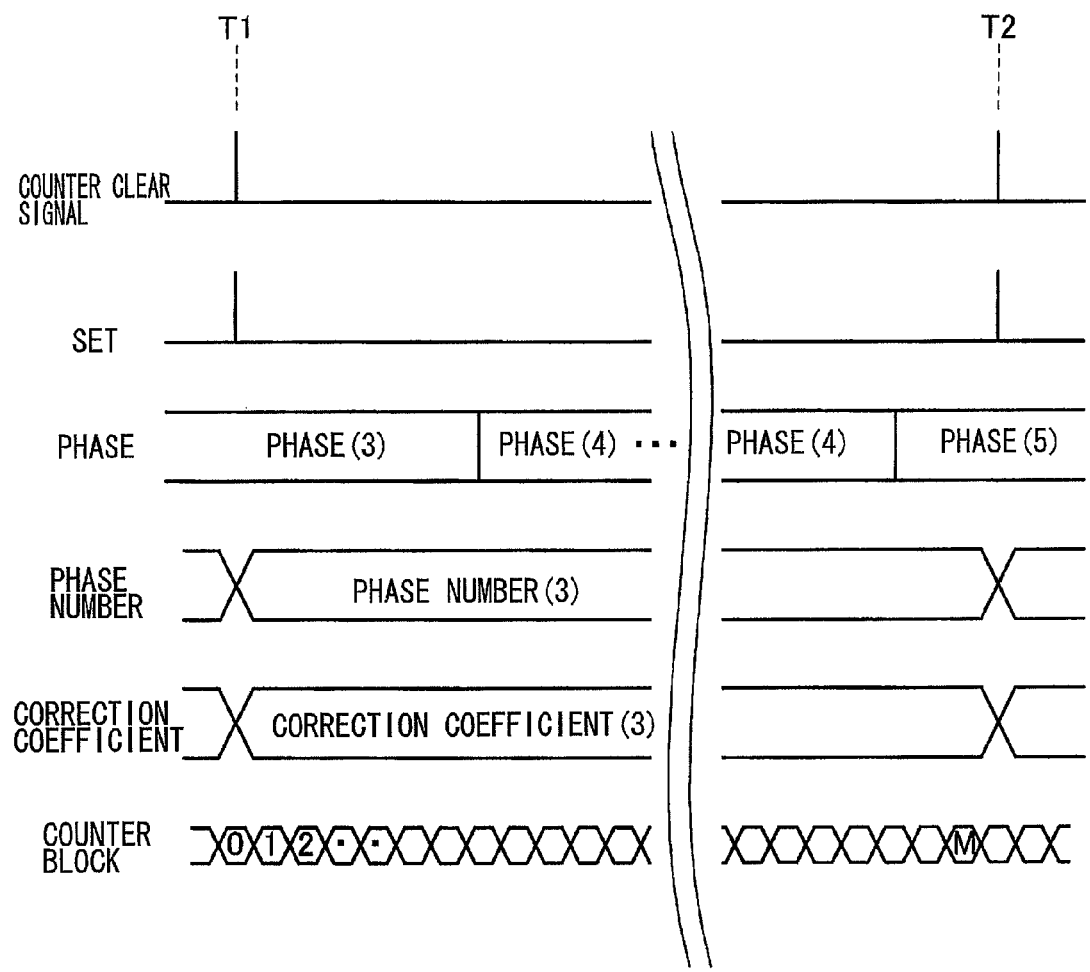
FIG. 5 is a timing chart illustrating how the control block shown in FIG. 3A controls the length of the reading time.

FIG. 5 shows a sample of results obtained through operations of the counter block 13. Specifically, if the comparator 17 outputs a high level signal as the counter clear signal at a time T1, the counter value of the counter block 13 is reset to 0. Since the high level signal is also inputted into the SET terminal of the phase detection circuit 15 as the SET signal, the phase number corresponding to the phase at this point in time (phase (3) in the example of FIG. 5) is continuously inputted into the decoder 23. Consequently, the decoder 23 continuously outputs the correction coefficient stored in the table that corresponds to this phase number (i.e., the value 66 shown in Table 2), while the counter block 13 continues to count cycles of the SSC. At a time T2 when the counter value outputted from the counter block 13 reaches a prescribed value M equivalent to the sum of the register setting 1_1 and the correction coefficient (32,566 in this example), the comparator 17 once again outputs a high level signal.

Accordingly, the control block 10 according to the embodiment can suppress fluctuations in the length of periods between times that the counter block 13 is cleared caused by fluctuations in the SSC frequency. The device control signal generating block 11 outputs the TG signal when the counter value of the counter block 13 is reset to 0.

Therefore, the control block 10 according to the embodiment can suppress fluctuations in the reading time caused by variations in the frequency of the SSC. In other words, in a comparative example, in which the comparator 17 directly compares the register setting 1_1 with the counter value from the counter block 13, changes in the SSC frequency will result in a non-uniform interval between reading positions RP relative to the original being conveyed at a constant speed, as shown in (A) in FIG. 6, and produce an offset Δ between the reading position RP and a motor conveying distance Tm at which the original is conveyed. On the other hand, the control block 10 according to the embodiment can suppress fluctuations in the reading time, as described above, and can produce a uniform interval between reading positions RP so that the reading positions RP are aligned with motor conveying distances Tm, as shown in (B) in FIG. 6.

Figure 7:
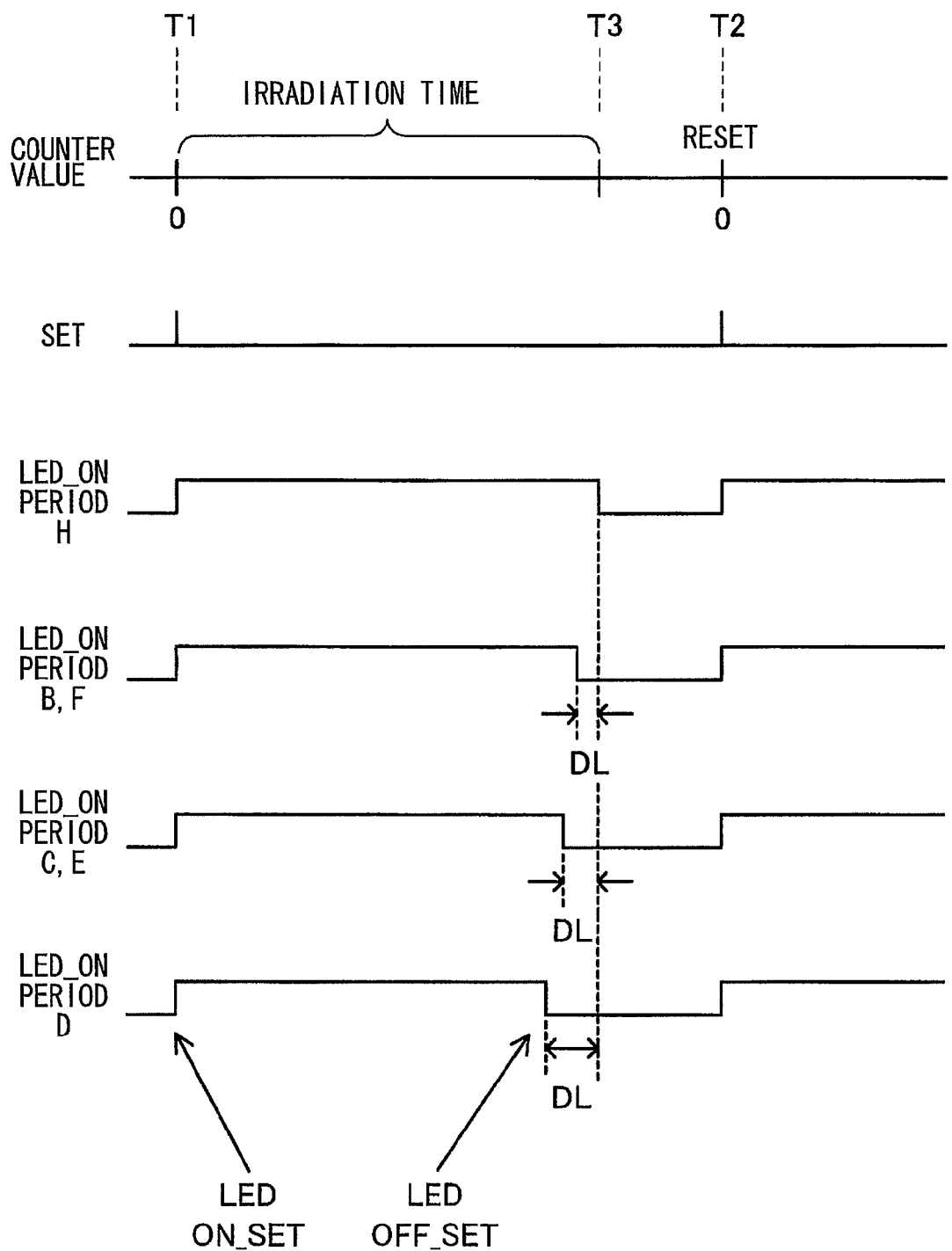
FIG. 7 is an explanatory diagram illustrating how the length of the irradiation time varies under the control performed by the control block according to the first embodiment.

As shown in FIG. 7, the device control signal generating block 11 according to the embodiment outputs the LED_ON signal so that the signal rises (LEDON_SET) at the time T1 when the counter value is reset to 0 and falls (LEDOFF_SET) at a time T3 when the counter value reaches a value corresponding to a prescribed irradiation time. Consequently, the period in which the LED_ON signal is high (LED_ON period) is longer for the period (H) at which the average frequency is low, and grows gradually shorter for period (B) or (F), period (C) or (E), and period (D), as shown in FIG. 7. In FIG. 7, DL denotes the decrease in length of each LED_ON period relative to the LED_ON period corresponding to period (H).

Figure 6:
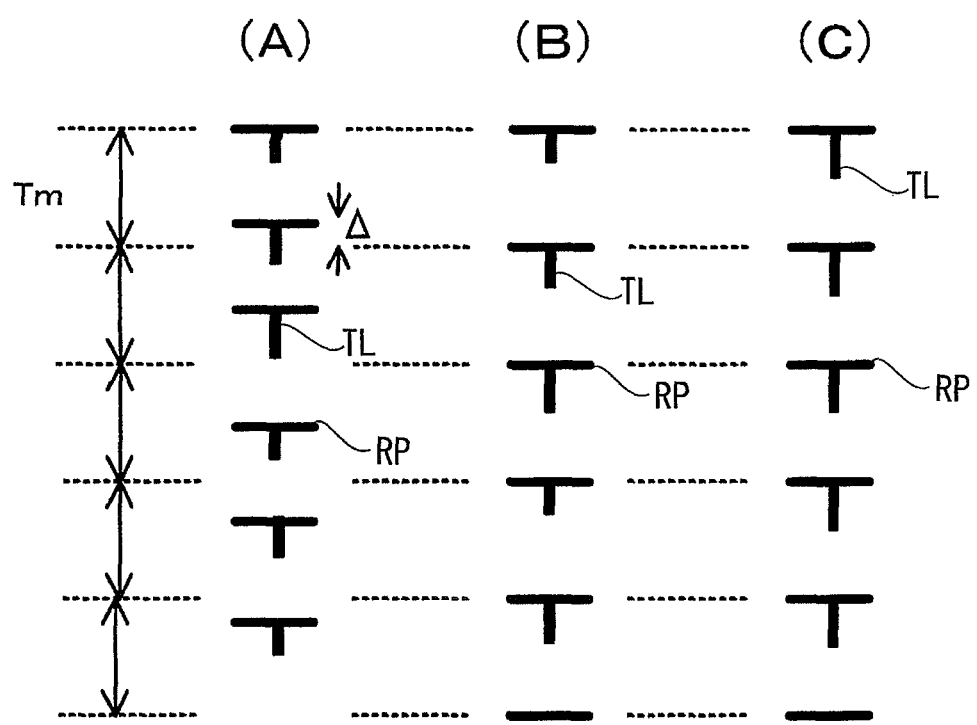
FIG. 6 shows timing charts illustrating how the control block controls the lengths of the reading time and the irradiation time, wherein (A) is for a comparative example in which the length of the reading time or the length of the irradiation time is not controlled, (B) is for the first embodiment, in which only the length of the reading time is controlled; and (C) is for a second embodiment, in which both of the lengths of the reading time and the irradiation time are controlled.

Therefore, in the first embodiment, the length of an irradiation time TL of the light source 7 fluctuates as illustrated in (B) in FIG. 6. (C) in FIG. 6 illustrates how fluctuations in the length of the irradiation time TL are suppressed according to a configuration of a second embodiment described next.

<Second Embodiment>

Figure 8:
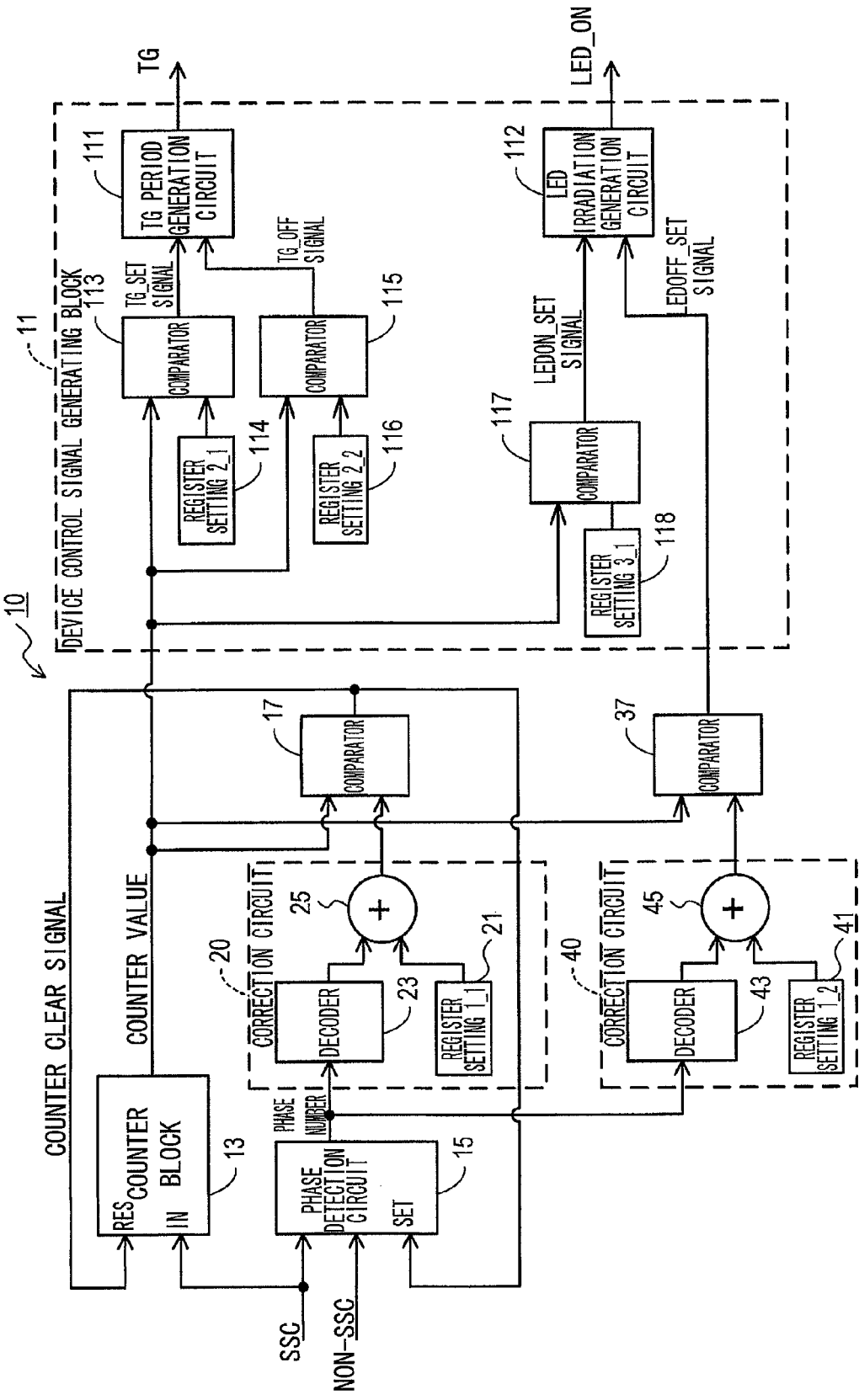
FIG. 8 is a block diagram showing the structure of a control block according to the second embodiment.

In the second embodiment, the control block 10 is modified as shown in FIG. 8. As shown in FIG. 8, in addition to the counter block 13, phase detection circuit 15, comparator 17, and correction circuit 20 described in the first embodiment, the control block 10 also includes a comparator 37 and a correction circuit 40. The structure of the device control signal generating block 11 according to the second embodiment also differs from that of the first embodiment, as will be described below.

The correction circuit 40 is provided with a register 41, a decoder 43, and an adder 45. The register 41 outputs a register setting 1_2. The decoder 43 outputs a correction coefficient corresponding to the phase number (SET-signal timing phase number) that is outputted from the phase detection circuit 15 in the same manner as in the first embodiment. Similarly to the decoder 23 in the first embodiment, the decoder 43 has a built-in table that stores, in association with phase numbers (1)-(8), correction coefficients corresponding to the desired irradiation time length. The adder 45 adds the values outputted from the register 41 and decoder 43 and inputs the sum into the comparator 37. The comparator 37 outputs an LEDOFF_SET signal when the inputted sum matches the counter value outputted from the counter block 13. The register setting 1_2 is a value obtained by adding a register setting 3_1 described later to an irradiation reference clock cycle number used as reference for the desired length of the irradiation time.

The device control signal generating block 11 has a TG period generation circuit 111 for generating and outputting the TG signal described in the first embodiment, and an LED irradiation generation circuit 112 for outputting the LED ON signal described above. The LED irradiation generation circuit 112 makes the LED_ON signal fall when the comparator 37 inputs the LEDOFF_SET signal. Hence, fluctuations in the length of the period beginning from when the counter block 13 starts counting and ending when the light source 7 is turned off caused by changes in the frequency of the SSC can be suppressed by adding the comparator 37 and correction circuit 40 described above.

The device control signal generating block 11 is also provided with comparators 113, 115, and 117 and registers 114, 116, and 118 described next. The comparator 113 compares a register setting 2_1 stored in the register 114 with the counter value outputted from the counter block 13 and outputs a TG_SET signal to the TG period generation circuit 111 when the two values match. The comparator 115 compares a register setting 2_2 stored in the register 116 with the counter value and outputs a TG_OFF signal to the TG period generation circuit 111 when the two values match. The TG period generation circuit 111 makes the TG signal rise when a TG_SET signal is inputted from the comparator 113 and fall when a TG_OFF signal is inputted from the comparator 115.

The comparator 117 compares the register setting 3_1 stored in the register 118 with the counter value outputted from the counter block 13 and outputs a LEDON_SET signal to the LED irradiation generation circuit 112 when the two values match. The LED irradiation generation circuit 112 makes the LED_ON signal rise when a LEDON_SET signal is inputted from the comparator 117 and fall when a LEDOFF_SET signal is inputted.

Figure 9:
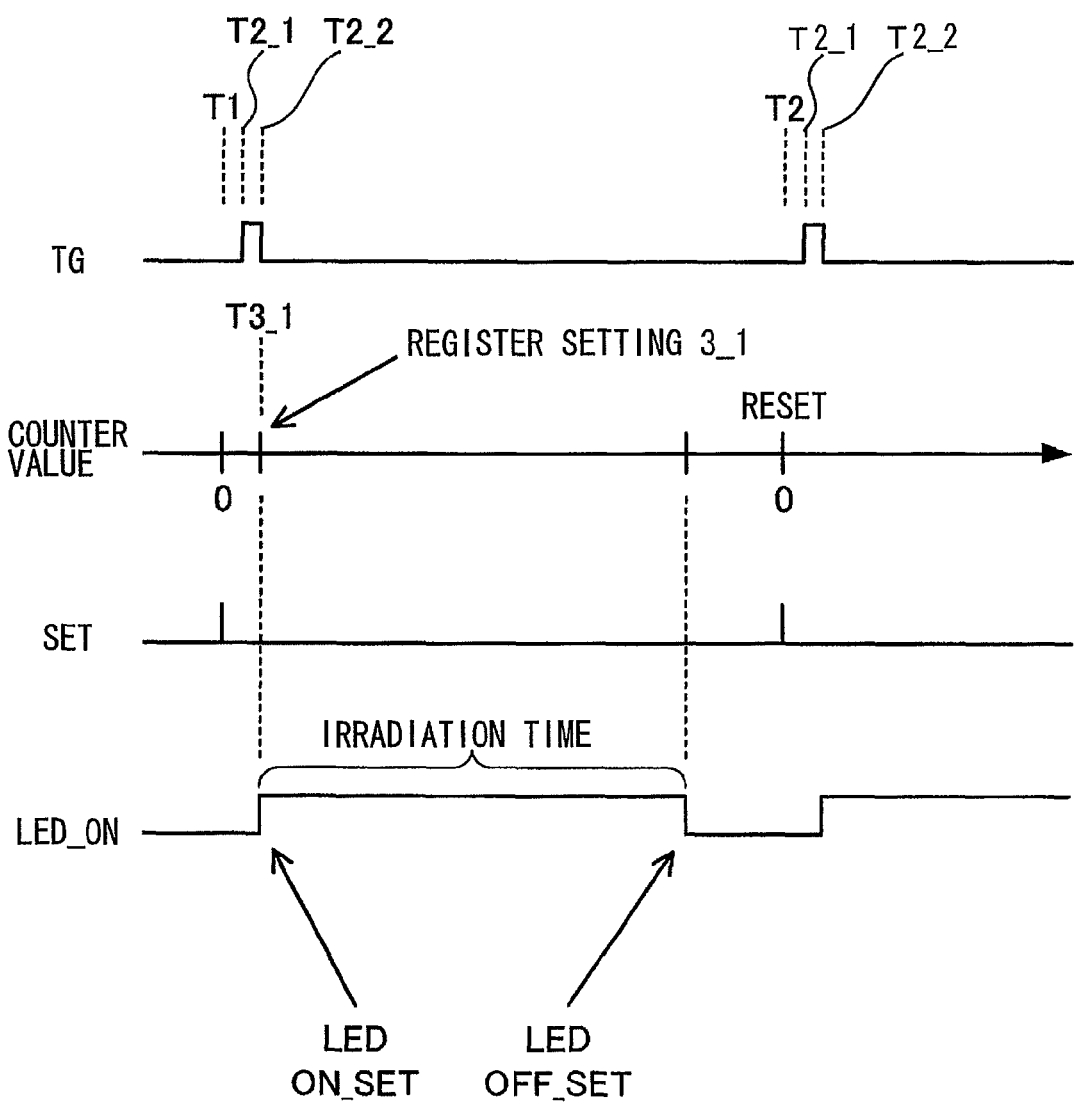

As shown in FIG. 9, the counter value accumulated in the counter block 13 is reset at a time T1. At a time T2_1 when the counter value in the counter block 13 reaches the register setting 2_1, the TG signal rises, starting the reading time. At a time T2_2 when the counter value reaches the register setting 2_2, the TG signal falls. However, this reading time continues until the next time the TG signal rises (T2). The period between the sequential rising edges of the TG signal (period between the successively-appearing timings T2_1) is equal to the time length from timing T1 when the counter block 13 starts counting to the timing T2 when the comparator 17 detects matching of the compared values. Therefore, the reading time length is not fluctuated despite changes in the frequency of the SSC.

Further, at a time T3_1 when the counter value in the counter block 13 reaches the register setting 3_1, after the value was reset at time T1, the LED_ON signal rises, starting the irradiation time. When the counter value reaches a value produced by the correction circuit 40 by correcting the register setting 1_2 based on the phase number inputted from the phase detection circuit 15, the LED_ON signal falls, ending the irradiation time.

Here, the periods from when the counter value was cleared until the rising and falling edges of the TG signal and the rising edge of the LED ON signal are all affected by the frequency of the SSC corresponding to the register settings 2_1, 2_2, and 3_1. However, since these register settings are all small values between 0 and 7, the effects of the SSC frequency are negligible.

Therefore, the control block 10 according to the second embodiment suppresses most fluctuations in the reading time caused by changes in the SSC frequency and suppresses fluctuations in the reading positions RP. The control block 10 can also suppress most fluctuations in the length of the irradiation time TL caused by fluctuations in the SSC frequency.

The register setting 2_1 may be set to zero (0). The register setting 3_1 may also be set to zero (0).

<Third Embodiment>

Figure 10:
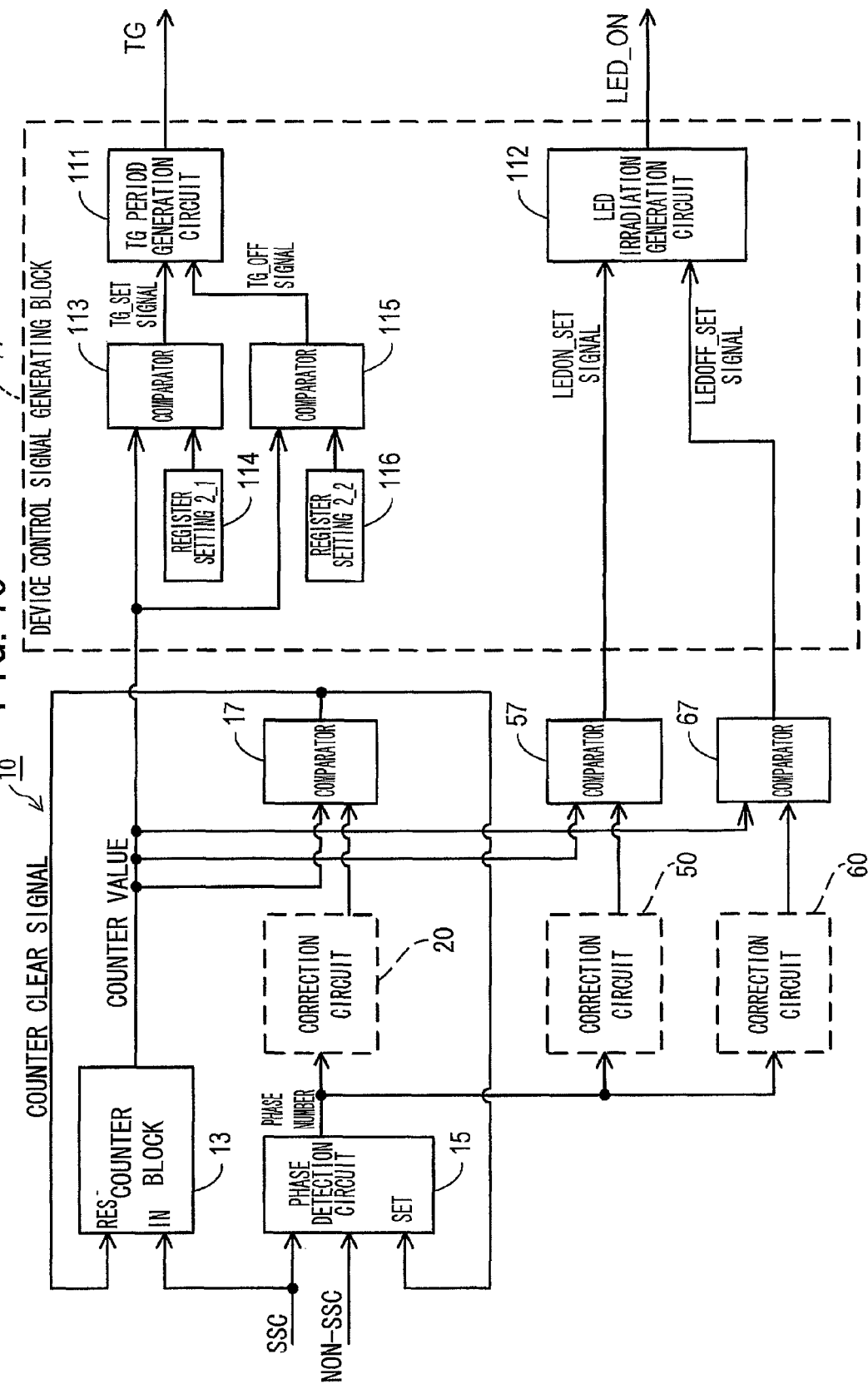
FIG. 10 is a block diagram showing the structure of a control block according to a third embodiment.

In a third embodiment of the present invention, the control block 10 is modified as shown in FIG. 10. The control block 10 according to the third embodiment is identical to that described in the second embodiment, except for the following differences. In the third embodiment, the control block 10 includes correction circuits 50 and 60, and comparators 57 and 67. When the value outputted from the correction circuit 50 matches the counter value outputted from the counter block 13, the comparator 57 inputs an LEDON_SET signal into the LED irradiation generation circuit 112. When the value outputted from the correction circuit 60 matches the counter value, the comparator 67 inputs an LEDOFF_SET signal into the LED irradiation generation circuit 112.

Therefore, as in the second embodiment described above, the addition of the comparator 67 and correction circuit 60 enables the control block 10 according to the third embodiment to suppress fluctuations, caused by fluctuations in the SSC frequency, in the length of periods beginning from when the counter block 13 starts counting until the light source 7 is extinguished. The correction circuit 60 has a decoder, a register storing a register setting, and an adder, similarly to the correction circuit 40, except for the value of the register setting and except that the decoder has a built-in table that stores, in association with phase numbers (1)-(8), correction coefficients corresponding to the desired length of the period from the point the counter block 13 begins counting until the irradiation time ends.

Further, the addition of the comparator 57 and correction circuit 50 in the third embodiment enables the control block 10 to suppress fluctuations, caused by changes in the SSC frequency, in the length of periods from when the counter block 13 begins counting until the light source 7 is turned on. Although not shown in the drawing, the correction circuit 50 has a decoder, a register storing a register setting, and an adder, similarly to the correction circuit 40, except for the value of the register setting and except that the decoder has a built-in table that stores, in association with phase numbers (1)-(8), correction coefficients corresponding to the desired length of the period from the point the counter block 13 begins counting until the irradiation time begins.

Figure 11:
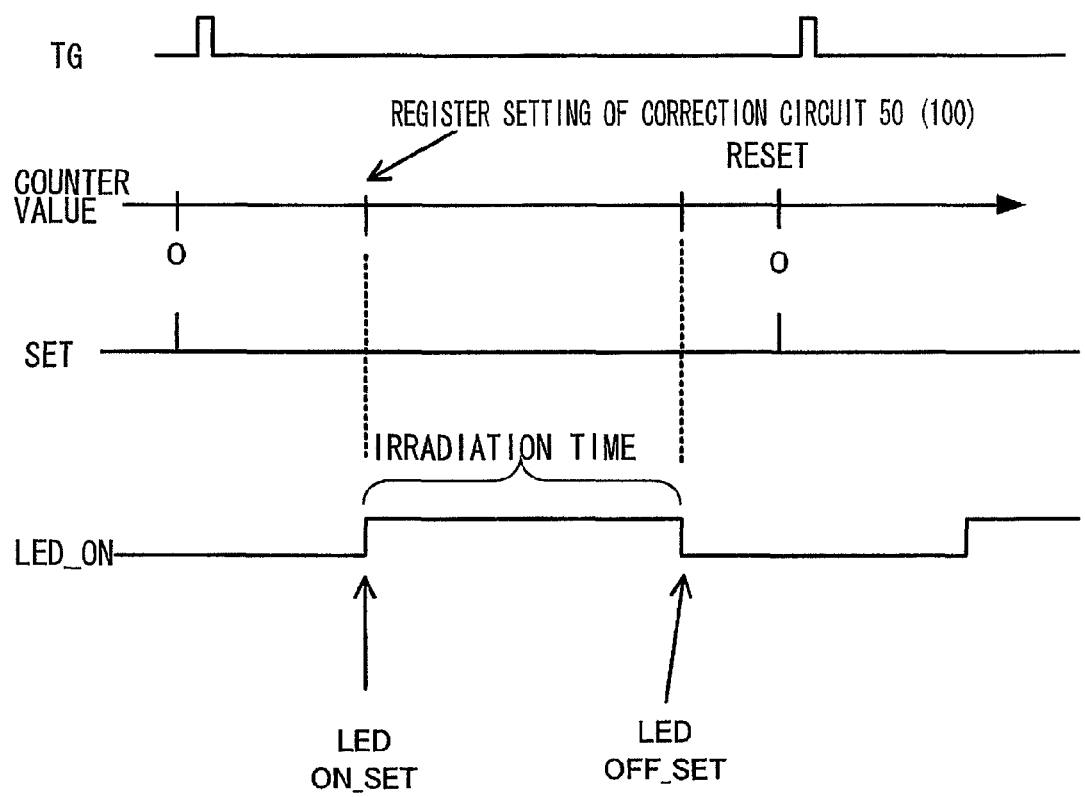
FIG. 11 is a timing chart illustrating how the control block shown in FIG. 10 controls various time lengths.

Hence, the control block 10 according to the third embodiment can suitably suppress fluctuations in the lengths of irradiation times, even when the start of the irradiation time is offset from the rising edge of the TG signal. For example, if the register setting of the correction circuit 50 is set to a relatively high value, such as 100, as shown in FIG. 11, the control block 10 of the third embodiment can suppress fluctuations, caused by changes in the SSC frequency, in the length of the period from the point the counter is reset until the irradiation time begins. In this case, the control block 10 can better suppress fluctuations in the irradiation time TL, thereby allowing the irradiation time to be arranged arbitrarily within the reading time.

<Fourth Embodiment>

Figure 12:
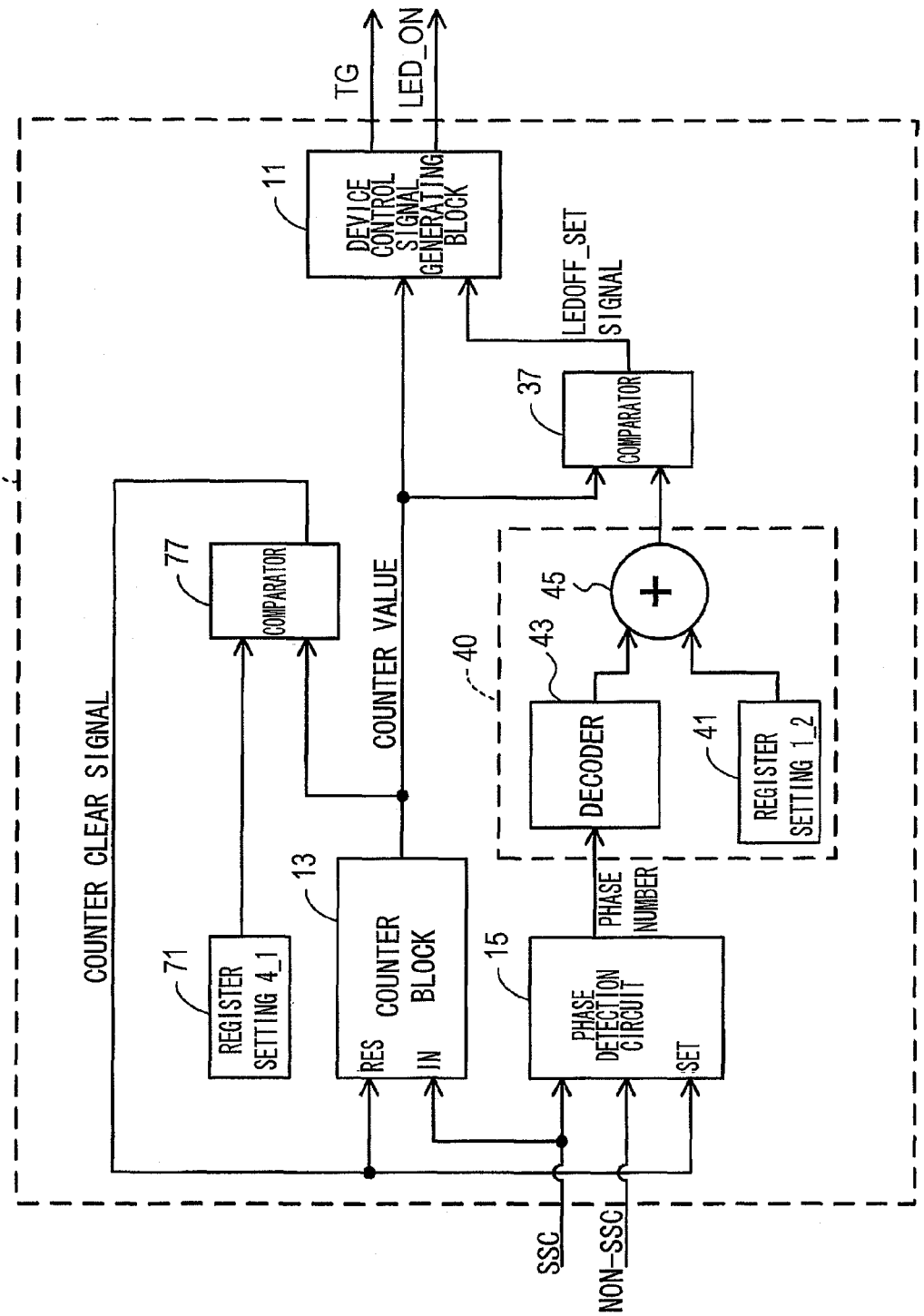
FIG. 12 is a block diagram showing the structure of a control block according to a fourth embodiment.

In a fourth embodiment of the present invention, the control block 10 is modified as shown in FIG. 12.

As shown in FIG. 12, the control block 10 of the fourth embodiment also includes the counter block 13, phase detection circuit 15, correction circuit 40, and comparator 37 that are the same as those described in the second embodiment.

As in the first embodiment, the device control signal generating block 11 according to the fourth embodiment outputs a TG signal when the counter value is reset to zero (0). The device control signal generating block 11 also makes the LED ON signal rise when the counter value is reset to 0 and fall when a high level signal (LEDOFF_SET signal) is inputted from the comparator 37. Therefore, the irradiation time extends from the point that the counter block 13 starts counting until the comparator 37 determines that the value outputted from the correction circuit 40 matches the counter value. Thus, the control block 10 according to the fourth embodiment can adequately suppress fluctuations in the irradiation time.

The control block 10 according to the fourth embodiment further includes a register 71, and a comparator 77. The comparator 77 compares the register setting 4_1 stored in the register 71 with the counter value outputted from the counter block 13. When the values match, the comparator 77 outputs a counter clear signal into the RES terminal of the counter block 13 and outputs a SET signal into the SET terminal of the phase detection circuit 15. The register setting 4_1 is set larger than the register setting 1_2. The irradiation time is contained in the reading time, which is the interval between consecutively outputted counter clear signals. However, the length of the reading time is affected by the frequency of the SSC and, hence, fluctuations in this length cannot always be suppressed.

<Fifth Embodiment>

Figure 13:
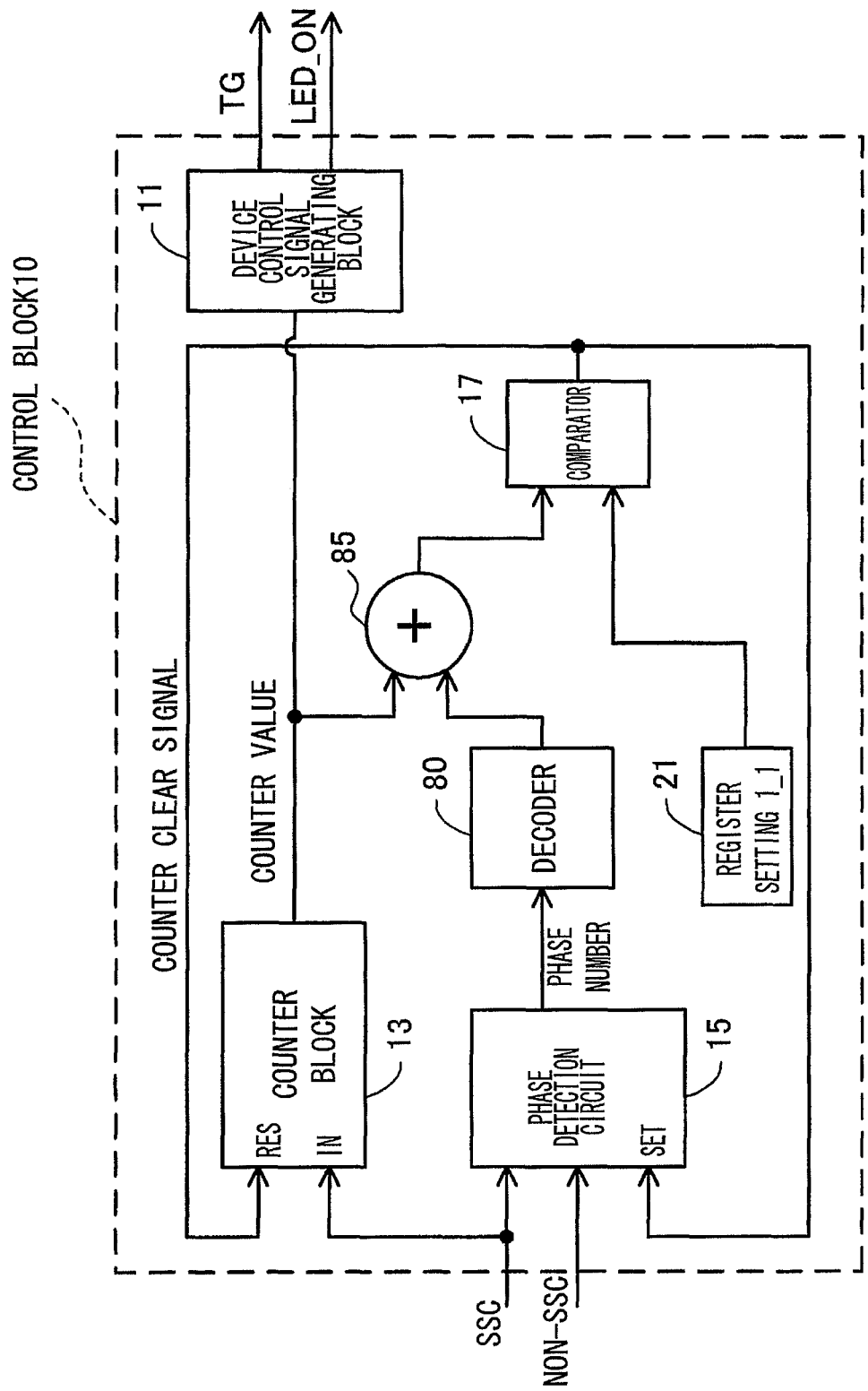
FIG. 13 is a block diagram showing the structure of a control block according to a fifth embodiment.

In a fifth embodiment of the present invention, the control block 10 is modified as shown in FIG. 13. As shown in FIG. 13, the control block 10 according to the fifth embodiment has a structure identical to the control block 10 according to the first embodiment, except for the following points. In the control block 10 according to the fifth embodiment, the register setting 1_1 stored in the register 21 is inputted unchanged into the comparator 17. However, the counter value that the comparator 17 compares to this register setting 1_1 is corrected by a decoder 80 and an adder 85 described below.

The decoder 80 outputs a correction coefficient based on the phase number (SET-signal timing phase number) received from the phase detection circuit 15. The correction coefficient is for correcting the number of SSC cycles counted by the counter block 13 to such a counter value that will be obtained by the counter block 13 if the counter block 13 counts cycles of a non-SSC, for example. More specifically, the decoder 80 has a built-in table, such as that shown in Table 3 below.

TABLE 3

| Phase number at the beginning of Period | Correction coefficient |
|---|---|
| (1) | 65 |
| (2) | 0 |
| (3) | −66 |
| (4) | −97 |
| (5) | −66 |
| (6) | 0 |
| (7) | 65 |
| (8) | 98 |

It is apparent from Table 3 that the correction coefficients in the built-in table in the decoder 80 have the same absolute values but opposite signs with respect to those stored in the decoder 23 in the first embodiment (Table 2), in association with the same phase number. The adder 85 adds the correction coefficient outputted from the decoder 80 to the counter value outputted from the counter block 13 to produce a sum for suppressing the effects of frequency changes in the SSC. By using the comparator 17 to compare the sum of the counter value and the correction coefficient to the register setting 1_1, the control block 10 can obtain the same operations and effects as the control block 10 according to the first embodiment.

The control block 10 according to the second through fourth embodiments can be modified in the same manner as described above for the fifth embodiment so that each of the comparators 17, 37, 57, and 67 compares the counter value corrected by the corresponding correction coefficient (a sum of the counter value and the correction coefficient) and a not-corrected register setting.

Variations of the Embodiments

While the invention has been described in detail with reference to specific embodiments thereof, it would be apparent to those skilled in the art that many modifications and variations may be made therein without departing from the spirit of the invention, the scope of which is defined by the attached claims.

For example, in the embodiments described above, the SSC is plotted along the horizontal axis indicative of the SSC counter values as shown in FIG. 4, and the modulation period T is divided into a plurality of phases by the fixed amount of SSC counter values (1,250). However, similar control may be implemented by plotting the SSC along a horizontal axis of time and by dividing the modulation period T into a plurality of phases by the fixed length of time. For example, the SSC may be plotted along a horizontal axis of reference counter values and by dividing the modulation period T into a plurality of phases by the fixed amount of reference counter values.

Further, the embodiments describe control for ADF reading, i.e., reading an original as the original is conveyed by the original conveying device 918 at a constant speed. However, the present invention may similarly be applied to control for flatbed reading, i.e., reading of an original on the first platen glass 914 while the reading device 1 is conveyed rightward in FIG. 1 at a constant speed.

Further, the counter block 13 may continue to count up without the counter value being reset. In this case, each of the register settings must be updated every time the comparator outputs a high level signal, thereby achieving the same control described in the embodiments. Further, since the counter value in the counter block 13 returns to 0 when the counter block 13 overflows, the counter block 13 should be provided with at least the same number of digits needed for the desired register settings.

In the embodiments, the control block 10 obtains a correction value based on the phase that is detected at the time the counter block 13 starts counting to set the lengths of the reading time and the irradiation time, but the control block 10 may be modified to acquire a correction value based on a phase that is detected a prescribed number of SSC signals before or after the counter block 13 starts counting to set the lengths of the reading time and the irradiation time. In this case, the correction coefficients stored in the decoder should be modified based on the prescribed number of SSC signals.

For example, in order to modify the control block 10 of the first embodiment so that the control block 10 obtains a correction value based on a phase that is detected a prescribed number of SSC signals before the counter block 13 starts counting, if the prescribed number is smaller than the number (1,250) of SSC signals for one phase, the correction coefficients stored in the decoder 23 are modified as shown in Table 4 below by cyclically shifting the correction coefficients in Table 2 so that the correction coefficients in Table 2 for phase numbers (2), (3), (4), (5), (6), (7), (8), and (1) are set in Table 4 for phase numbers (1)-(8), respectively. This is because the phase of the SSC at the time when the counter block 13 starts counting is one phase following the phase that is detected by the phase detection circuit 15.

TABLE 4

| Phase number at a timing a prescribed number of SSC signals before beginning of Period, wherein the prescribed number is smaller than 1,250 | Correction coefficient |
|---|---|
| (1) | 0 |
| (2) | 66 |
| (3) | 97 |
| (4) | 66 |
| (5) | 0 |
| (6) | −65 |
| (7) | −98 |
| (8) | −65 |

In the second embodiment, the control block 10 is configured so that the correction circuits 20 and 40 acquire correction values based on a phase that is detected when the counter block 13 starts counting to set the lengths of the reading time and the irradiation time. However, the control block 10 may be modified so that the correction circuits 20 and 40 acquire correction values based on phases that are detected at different timings. For example, a phase detection circuit 15 is provided in correspondence with one set of the correction circuit 20 and the comparator 17, and an additional phase detection circuit 15 is provided in correspondence with one set of the correction circuit 40 and the comparator 37. Similarly, the control block 10 in the third embodiment may be modified so that the correction circuits 20, 50, and 60 acquire correction values based on phases that are detected at different timings.

The control block 10 may continuously acquire the phase while the counter block 13 is counting to set the lengths of the reading time and the irradiation time and may acquire correction values based on the cumulative counter value of the SSC. For example, the control block 10 in the first embodiment is modified as described below. The SET terminal is omitted from the phase detection circuit 15 by omitting the output buffer 357 from the phase detection circuit 15. The comparator 17 does not supply the phase detection circuit 15 with the SET signal even when the comparator 17 determines that the compared values match. So, the phase detection circuit 15 continuously outputs the current phase number that is continuously changing through the phase numbers (1)-(8). The decoder 23 is modified to have a built-in table, such as that shown in Table 5 below, correlating correction coefficients with phase numbers (1)-(8) that appear at last during the respective periods (A)-(H). It can be considered that the phase number inputted from the phase detection circuit 15 indicates at which phase the presently-measured time might possibly end. So, the decoder 23 outputs a correction coefficient that is associated with a phase number equal to the phase number that is currently outputted from the phase detection circuit 15 as indicative of the current phase number. It is noted that the periods A-H, which begin with the phases (1), (2), (3), (4), (5), (6), (7), and (8), respectively, are ended with phases (2), (3), (4), (5), (6), (7), (8), and and (1), respectively. So, the correction coefficients stored in the decoder 23 are modified as shown in Table 5 below by cyclically shifting the correction coefficients in Table 2 so that the correction coefficients in Table 2 for phase numbers (8), (1), (2), (3), (4), (5), (6), and (7) are set in Table 5 for phase numbers (1)-(8), respectively.

TABLE 5

| Phase number at the end of Period | Correction coefficient |
|---|---|
| (1) | −98 |
| (2) | −65 |
| (3) | 0 |
| (4) | 66 |
| (5) | 97 |
| (6) | 66 |
| (7) | 0 |
| (8) | −65 |

The comparator 17 outputs a counter clear signal to the counter block 13 when the accumulated counter value becomes greater than or equal to a sum of the register setting 1_1 and the correction coefficient that is outputted from the decoder 23 in correspondence with the currently-detected phase. It is noted, however, that the process described in the embodiments is simpler than the process in this variation since the control block 10 in the embodiments detects the phase and acquires a correction value only one time, i.e., when the counter block 13 begins counting to set the lengths of the reading time and the irradiation time.

The clock generator 95 may be provided with an edge detection flag indicative of whether the frequency of the SSC is now increasing or decreasing. The clock generator 95 turns on the edge detection flag at a time when the frequency of the SSC changes from the state where the frequency increases to the state where the frequency decreases. In other words, the clock generator 95 turns on the edge detection flag when the frequency becomes the highest. The clock generator 95 may supply the phase detection circuit 15 with a flag-state indicating signal indicating the state of the edge flag.

In this case, the clock generator 95 may supply the phase detection circuit 15 with the flag-state indicating signal instead of the reference clock (non-SSC). The reference clock counter 342, counter buffer 351, comparator circuit 355, configuration register 353, and delay circuit 370 may be omitted from the phase detection circuit 15. Instead, the clock generator 95 supplies the flag-state indicating signal directly to the combinational circuit 358. The pulse generating circuit 348 is modified to supply the generated one-phase completion pulse directly to the combinational circuit 358. Thus, the pulse generating circuit 348 supplies the generated one-phase completion pulse to the reference clock counter 342, SSC counter 345, and combinational circuit 358.

With this configuration, when the flag-state indicating signal indicates that the edge flag turns on, it is known that the frequency of the SSC pulses reaches the highest. So, while the flag-state indicating signal does not indicate that the edge flag turns on, the combinational circuit 358 increments the phase number by one (1) every time the one-phase completion pulse is received from the pulse generating circuit 348. If the flag-state indicating signal indicates that the edge flag turns on, the combinational circuit 358 sets the phase number compulsorily to "5" at a timing when the combinational circuit 358 receives the one-phase completion pulse from the pulse generating circuit 348 for the first time after the edge flag turns on.

The configuration of the phase detection circuit 15 is not limited to those in the above-described embodiments and modifications. The phase detection circuit 15 can be modified to other various configurations that can detect the phase of the SSC.

In the above description, the SSC and the non-SSC are in the form of pulses. However, the SSC and the non-SSC may be in the form of other signals. For example, the SSC and the non-SSC may be in the form of analog signals.

What is claimed is:

1. An image-reading device comprising:
reading device that is configured to read an image from an original in units of a reading time as the original moves relative to the reading device at a constant speed and in a constant direction, the reading device comprising a light source and an image sensor including light receiving elements arranged in a direction orthogonal to the constant direction, the light source being configured to irradiate light, each of the light receiving elements being configured to receive light reflected from the original and output data indicative of the amount of light that has been received during the reading time, thereby reading the image from the original;
a clock generator that is configured to generate a single spread-spectrum clock whose frequency is modulated with a constant modulation period, such that the frequency increases and decreases within a prescribed frequency range during each modulation period, the prescribed frequency range being divided into a plurality of frequency sub-ranges, each modulation period being divided into a plurality of successive phases such that each phase is positioned at an n-th order in the modulation period, wherein a number "n" is an integer greater than or equal to one (1) and smaller than or equal to a total number of the phases in the each modulation period, the number "n" indicative of an order of a phase in the modulation period being defined as a phase number, the phases being defined such that when the spread-spectrum clock is in one of the phases, the frequency of the spread-spectrum clock increases or decreases within one of the frequency sub-ranges, each phase indicating which of the frequency sub-ranges the frequency of the spread-spectrum clock is in and whether the frequency of the spread-spectrum clock increases or decreases such that a phase in which the frequency of the spread-spectrum clock increases within one frequency sub-range, being different from a phase in which the frequency of the spread-spectrum clock decreases within the same frequency sub-range;
a counter that is configured to count a number of clock cycles of the spread-spectrum clock as a counter value;
a phase detection circuit that is configured to detect a phase of the spread-spectrum clock by determining a phase number "n" indicative of an order of a phase in the modulation period, in which the spread-spectrum clock is;
a reference-data storage device storing data indicative of a reference clock cycle number, the reference clock cycle number being defined as a reference for a desired length of at least one of the reading time and an irradiation time, the irradiation time being defined as a time during which the light source irradiates light, the irradiation time being within the reading time;
a correction circuit that has a correction-data storage device storing data indicative of a plurality of prescribed correction amounts in association with a plurality of phase numbers, respectively, the correction circuit being configured to correct either one of the counter value counted by the counter and the reference clock cycle number based on one of the prescribed correction amounts that is stored in the correction-data storage device in association with one of the phase numbers that is equal to a phase that is detected by the phase detection circuit at a time that is defined relative to when the counter performs counting;
a comparator that is configured to compare, with each other, the counter value and the reference clock cycle number, either one of which has been corrected by the correction circuit, and to determine whether or not the counter value and the reference clock cycle number satisfy a prescribed relationship; and
a device-control-signal generating circuit that is configured to set the length of the at least one of the reading time and the irradiation time based on: a timing when the counter starts counting to set the length of the at least one of the reading time and the irradiation time; and a timing when the comparator determines that the compared values satisfy the prescribed relationship, to thereby allow the time length set by the device-control-signal generating circuit to remain constant despite changes in the frequency of the spread-spectrum clock, the device-control-signal generating circuit being configured to output to the reading device control signals indicative of lengths of the reading time and the irradiation time, thereby controlling the light source to irradiate light during the irradiation time and controlling the light receiving elements to output data indicative of the amounts of light received by the light receiving elements during the reading time.

2. The image-reading device according to claim 1, wherein the correction circuit corrects either one of the reference clock cycle number and the counter value based on one of: (1) a phase detected by the phase detection circuit at a time when the counter begins counting to set the length of the at least one of the reading time and the irradiation time; (2) a phase detected by the phase detection circuit a prescribed number of clock cycles of the spread-spectrum clock before the counter begins counting to set the length of the at least one of the reading time and the irradiation time; and (3) a phase detected by the phase detection circuit a prescribed number of clock cycles of the spread-spectrum clock after the counter begins counting to set the length of the at least one of the reading time and the irradiation time.

3. The image-reading device according to claim 2, wherein:
the phase detection circuit detects a phase at a time when the counter begins counting to set the length of the at least one of the reading time and the irradiation time;
the correction circuit corrects the reference clock cycle number into a value equivalent to a number of spread-spectrum clock cycles that is indicative of the desired time length and that will be counted beginning from the phase that is detected by the phase detection circuit;
the comparator determines whether or not the compared values match with each other; and
the device-control-signal generating circuit sets the length of the at least one of the reading time and the irradiation time, based on an interval beginning when the counter starts, counting to set the length of the at least one of the reading time and the irradiation time and ending when the comparator determines that the compared values match with each other.

4. The image-reading device according to claim 3, wherein the prescribed correction amount stored in the correction-data storage device in association with each of the plurality of phase numbers corresponds to a number of spread-spectrum clock cycles that corresponds to the desired time length and that will be counted beginning from the each phase.

5. The image-reading device according to claim 1, wherein the correction device comprises:
a reading time correction device that is configured to correct either one of a reading reference clock cycle number and the counter value based on a phase that is detected by the phase detection circuit at a time when the counter performs counting, the reading reference clock cycle number serving as reference for the desired length of the reading time; and
an irradiation time correction circuit that is configured to correct either one of: the counter value; and a sum of an irradiation reference clock cycle number and a first prescribed counter value based on a phase that is detected by the phase detection circuit at a time when the counter performs counting, the irradiation reference clock cycle number serving as reference for a desired length of the irradiation time,
wherein the comparator comprises:
a reading time comparator that is configured to compare, with each other, the counter value and the reading reference clock cycle number, either one of which has been corrected by the reading time correction device, and determine whether the compared values match; and
an irradiation time comparator that is configured to compare, with each other, the counter value and the sum, either one of which has been corrected by the irradiation time correction circuit, and determine whether the compared values match; and
wherein the device-control-signal generating circuit comprises:
a reading time device-control-signal generating circuit that is configured to set the length of the reading time as equal to a length of an interval that is defined from when the counter starts counting to set the lengths of the reading time and the irradiation time and until when the reading time comparator determines that the compared values match; and
an irradiation time device-control-signal generating circuit that is configured to set the length of the irradiation time to an interval from a time when the counter value counted by the counter reaches the first prescribed counter value to a time when the irradiation time comparator determines that the compared values match.

6. The image-reading device according to claim 1, wherein the correction circuit comprises:
a reading time correction circuit that is configured to correct either one of a reading reference clock cycle number and the counter value based on a phase detected by the phase detection device at a time when the counter performs counting, the reading reference clock cycle number serving as reference for the desired length of the reading time; and
an irradiation time correction circuit that is configured to correct either one of the counter value and a beginning reference clock cycle number based on a phase detected by the phase detection circuit at a time when the counter performs counting and to correct either one of the counter value and an ending reference clock cycle number based on a phase detected by the phase detection circuit at a time when the counter performs counting, the beginning reference clock cycle number serving as reference for a beginning portion of the irradiation time, the ending reference clock cycle number serving as reference for an ending portion of the irradiation time;
wherein the comparator further comprises:
a reading time comparator that is configured to compare, with each other, the counter value and the reading reference clock cycle number, either one of which has been corrected by the reading time correction circuit, and determine whether the compared values match;
a first irradiation time comparator that is configured to compare, with each other, the counter value and the beginning reference clock cycle number, either one of which has been corrected by the irradiation time correction circuit, and determine whether the compared values match; and
a second irradiation time comparator that is configured to compare, with each other, the counter value and the ending reference clock cycle number, either one of which has been corrected by the irradiation time correction circuit, and determine whether the compared values match, and
wherein the device-control-signal generating circuit comprises:
a reading time device-control-signal generating circuit that sets the length of the reading time as equal to a length of an interval that is defined from when the counter begins counting to set the lengths of the reading time and the irradiation time and until when the reading time comparator determines that the compared values match; and
a second irradiation time device-control-signal generating circuit that sets the length of the irradiation time to an interval beginning from when the first irradiation time comparator determines that the compared values match to when the second irradiation time comparator determines that the compared values match.

7. The image-reading device according to claim 1, wherein the clock generator is configured to further generate a reference clock, whose frequency is fixed, and
wherein the phase detection circuit includes:
a reference clock counter configured to count a number of clock cycles of the reference clock; and
a spread-spectrum clock counter configured to count a number of clock cycles of the spread-spectrum clock; and
a comparing device configured to determine the phase of the spread-spectrum clock based on a relationship between the counted number of the clock cycles of the reference clock and the counted number of the clock cycles of the spread-spectrum clock.

8. The image-reading device according to claim 1, wherein the correction circuit is connected with the reference-data storage device and configured to correct the reference clock cycle number, and the comparator is connected with both of the counter and the correction circuit to compare the counter value and the corrected reference clock cycle number.

9. The image-reading device according to claim 1, wherein the correction circuit is connected with the counter and configured to correct the counter value, and the comparator is connected with both of the reference-data storage device and the correction circuit to compare the corrected counter value and the reference clock cycle number.

10. The image-reading device according to claim 1, wherein the device-control-signal generating circuit is connected with both of the counter and the comparator.

\* \* \* \* \*

UNITED STATES PATENT AND TRADEMARK OFFICE
CERTIFICATE OF CORRECTION

PATENT NO. : 9,832,336 B2
APPLICATION NO. : 13/282396
DATED : November 28, 2017
INVENTOR(S) : Hideyuki Kusunoki It is certified that error appears in the above-identified patent and that said Letters Patent is hereby corrected as shown below:

In the Claims

Claim 3:
Column 18, Line 64: Delete "starts, counting" and replace with – starts counting – therefor.

Signed and Sealed this
Twenty-fourth Day of April, 2018

Andrei Iancu
*Director of the United States Patent and Trademark Office*